United States Patent
Clifford

(10) Patent No.: US 11,383,258 B2
(45) Date of Patent: Jul. 12, 2022

(54) ROBOTIC PAINTING BOOTH AND OPERATING METHOD

(71) Applicant: Fanuc America Corporation, Rochester Hills, MI (US)

(72) Inventor: Scott J. Clifford, Bloomfield Township, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 16/403,333

(22) Filed: May 3, 2019

(65) Prior Publication Data

US 2019/0337003 A1 Nov. 7, 2019

Related U.S. Application Data

(60) Provisional application No. 62/666,134, filed on May 3, 2018.

(51) Int. Cl.
 *B05B 13/04* (2006.01)
 *B25J 19/00* (2006.01)
 (Continued)

(52) U.S. Cl.
 CPC ............ *B05B 13/0431* (2013.01); *B05B 5/03* (2013.01); *B05B 12/00* (2013.01);
 (Continued)

(58) Field of Classification Search
 USPC ......... 118/309, 326, 634, 50, 323, 321, 313, 118/315; 427/427.2, 427.3, 8; 901/43
 See application file for complete search history.

(56) References Cited

U.S. PATENT DOCUMENTS

| 4,402,234 A | 9/1983 | Malarz et al. |
| 4,592,305 A | 6/1986 | Scharfenberger |

(Continued)

FOREIGN PATENT DOCUMENTS

| EP | 1749584 A1 | 2/2007 |
| EP | 2599599 A1 | 6/2013 |
| EP | 3012028 A1 | 4/2016 |

OTHER PUBLICATIONS

PCT International Search Report of the International Searching Authority dated Jul. 3, 2019 and dated Jul. 17, 2019 for International Application No. PCT/US2019/030734 filed May 3, 2019.

*Primary Examiner* — Yewebdar T Tadesse
(74) *Attorney, Agent, or Firm* — John A. Miller; Shumaker, Loop & Kendrick, LLP

(57) ABSTRACT

A next generation painting robot with advanced fluid delivery system, enhanced kinematics and a service airlock compartment. The painting robot includes a fluid delivery system which places color changing valves and pumping hardware on the back side of the robot's mounting pedestal, where it can be serviced without a technician having to enter the spray booth. Additionally, the robot enables routine cleaning and maintenance to be performed without personnel entering the spray booth and without stopping the vehicle conveyor, due to simplified outer arm design, improved home positioning and an airlock booth adjacent to the robot pedestal. Service personnel can clean and service the applicator and other components on the outer arm from the airlock booth, while other robots continue painting parts moving on the conveyor, without allowing fume-laden vapors into the operator aisle.

17 Claims, 17 Drawing Sheets

(51) Int. Cl.
  *B25J 21/00* (2006.01)
  *B05B 12/00* (2018.01)
  *B05B 14/40* (2018.01)
  *B05B 16/60* (2018.01)
  *B05B 15/55* (2018.01)
  *B05B 16/00* (2018.01)
  *B05B 5/03* (2006.01)
  *B25J 11/00* (2006.01)
  *B05B 16/40* (2018.01)
  *B05B 13/02* (2006.01)

(52) U.S. Cl.
  CPC ...... *B05B 13/0278* (2013.01); *B05B 13/0452* (2013.01); *B05B 14/40* (2018.02); *B05B 15/55* (2018.02); *B05B 16/40* (2018.02); *B05B 16/60* (2018.02); *B05B 16/90* (2018.02); *B05B 16/95* (2018.02); *B25J 11/0075* (2013.01); *B25J 19/0066* (2013.01); *B25J 19/0075* (2013.01); *B25J 21/00* (2013.01)

(56) References Cited

U.S. PATENT DOCUMENTS

| | | | |
|---|---|---|---|
| 4,644,897 A * | 2/1987 | Fender | B05B 13/0242 118/323 |
| 4,678,952 A | 7/1987 | Peterson et al. | |
| 4,714,179 A | 12/1987 | Otterstetter et al. | |
| 4,729,298 A | 3/1988 | Dornemann | |
| 4,737,759 A | 4/1988 | Stropkay et al. | |
| 4,904,148 A | 2/1990 | Larsson | |
| 4,975,856 A | 12/1990 | Vold et al. | |
| 4,999,553 A | 3/1991 | Seraji | |
| 5,113,600 A * | 5/1992 | Telchuk | F26B 21/04 34/90 |
| 5,192,595 A | 3/1993 | Akeel et al. | |
| 5,293,107 A | 3/1994 | Akeel | |
| 5,294,873 A | 3/1994 | Seraji | |
| 5,430,643 A | 7/1995 | Seraji | |
| 5,737,500 A | 4/1998 | Seraji et al. | |
| 5,781,705 A | 7/1998 | Endo | |
| 5,811,951 A | 9/1998 | Young | |
| 6,267,022 B1 * | 7/2001 | Suzuki | B25J 19/0075 74/490.01 |
| 7,140,559 B2 | 11/2006 | Giulano | |
| 7,399,363 B2 | 7/2008 | Clifford et al. | |
| 7,622,158 B2 | 11/2009 | Clifford et al. | |
| 7,756,606 B2 | 7/2010 | Nakajima et al. | |
| 7,971,504 B2 | 7/2011 | Haniya et al. | |
| 8,051,796 B2 | 11/2011 | Clifford | |
| 8,322,301 B2 | 12/2012 | Nakazono et al. | |
| 8,333,164 B2 | 12/2012 | Herre et al. | |
| 8,689,730 B2 | 4/2014 | Clifford | |
| 8,939,106 B2 | 1/2015 | Takahashi | |
| 9,327,401 B2 | 5/2016 | Xiao et al. | |
| 9,782,789 B2 | 10/2017 | Bania et al. | |
| 2003/0136336 A1 * | 7/2003 | Fouvet | B05B 13/0452 118/300 |
| 2004/0107900 A1 * | 6/2004 | Clifford | B05B 13/0431 118/305 |
| 2008/0083371 A1 | 4/2008 | Clifford et al. | |
| 2010/0047465 A1 | 2/2010 | Ansorge et al. | |
| 2015/0147460 A1 * | 5/2015 | Manzi | B05B 12/122 427/8 |
| 2017/0368579 A1 | 12/2017 | Prus et al. | |
| 2018/0221904 A1 * | 8/2018 | Yoshino | B05B 13/0452 |
| 2019/0151883 A1 * | 5/2019 | Tsui | B05B 12/004 |

\* cited by examiner

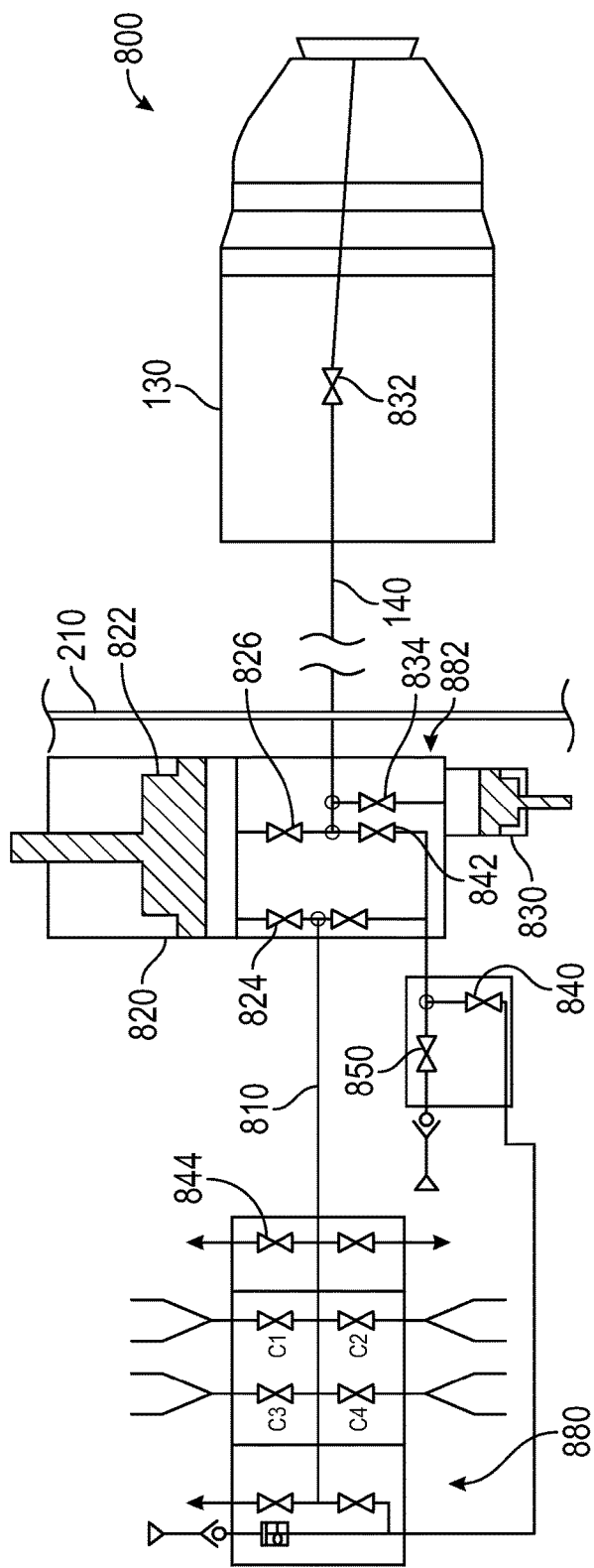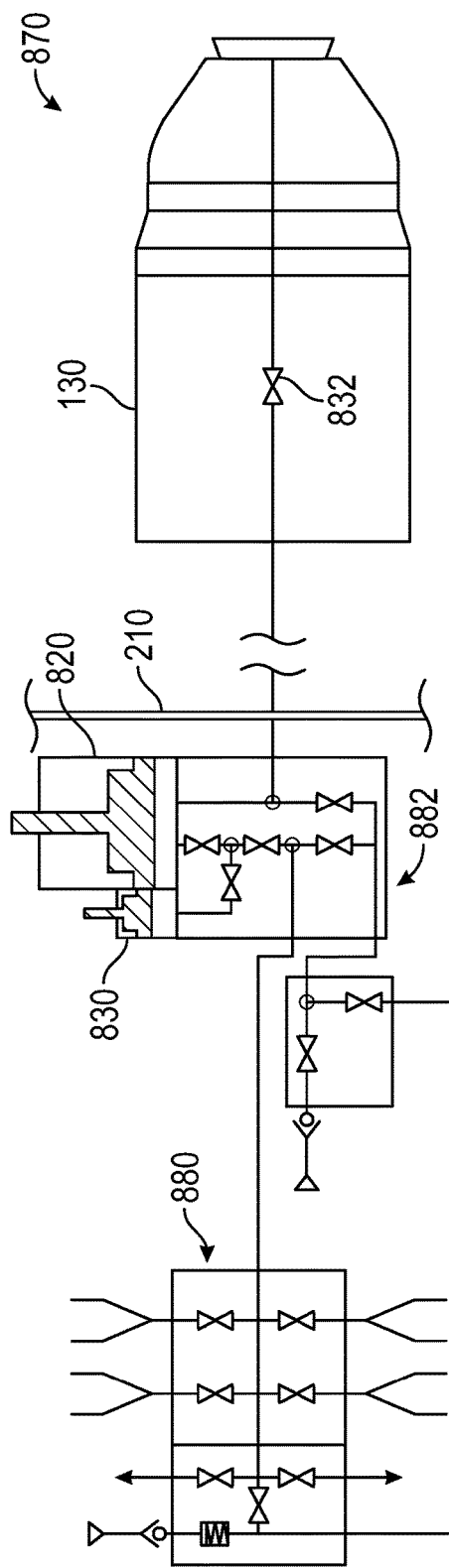

ROBOTIC PAINTING BOOTH AND OPERATING METHOD

CROSS-REFERENCE TO RELATED APPLICATIONS

This application claims the benefit of the priority date of U.S. Provisional Patent Application Ser. No. 62/666,134, titled NEXT GENERATION PAINTING ROBOT, filed May 3, 2018.

BACKGROUND

Field

The present disclosure relates generally to the field of robotic painting equipment and, more particularly, to an improved robotic system used for painting automobile bodies or automotive component parts. The improvements are offered to meet the modern needs of paint shops that run continuously without interrupting the painting process for equipment maintenance or equipment cleaning. The fluid delivery system includes valves, pumps, and fluid lines which are presented to minimize color change time and paint waste while being mounted outside the spray booth where they can be serviced without stopping painting operations. Enhanced robot kinematics having improved flexibility and reach enables a smaller spray booth footprint and a shortened paint line from the fluid delivery system to the applicator. Access to the key elements of the robot application components is provided from an airlock maintenance compartment for servicing and cleaning of applicator-end components during painting operations without emitting paint vapors into the operator aisle.

Discussion of the Related Art

Prior art painting robots and spray booths are well known. A typical prior art spray booth, used to paint the exterior surfaces of vehicle bodies in both continuous conveyance and stop station systems, includes a spray booth, a plurality of painting robots and opener/closer robots disposed on a periphery thereof. These robots can be mounted on the floor, the wall, the ceiling or side rails. The painting robots carry either spray guns or rotary applicators for directing atomized paint toward the vehicle body.

The spray booth, also known variously as a paint booth, spray cabin or painting cabin, has sophisticated environmental and air handling equipment which treats and exhausts the vapor-laden air from the spray booth, and prevents the paint vapors from entering an operator aisle where people are present. Maintenance workers and equipment operators can only enter the spray booth when painting operations have stopped, and sometimes must wait until the vapor-laden air has been exhausted and replaced by fresh air. Stopping painting operations to clean and maintain the equipment occurs periodically throughout the operations. The stopping period can be as much as thirty minutes every four hours, which is very costly.

Painting robot systems as described above have served the automotive industry well—producing high quality vehicle paint finishes, while minimizing human exposure to paint vapors, and limiting paint waste and environmental impacts. However, under the ever-present pressure to improve efficiency and reduce cost and waste, several aspects of present painting robots have been identified as being less than optimal.

One shortcoming of current painting systems is that the color changers and fluid pumping equipment are located inside the spray booth, typically on the extremities of the robot arm, and therefore the automation zone must be shut down in order to service these components. As discussed above, paint line downtime is expensive and to be avoided whenever possible. The fluid pumping equipment on current painting robots is typically located on the robot's outer arm, near the applicator, which means a technician must enter the spray booth in order to service the fluid delivery equipment. Furthermore, the traditional placement of the fluid delivery equipment on the outer arm increases the size and weight of the robot arms dramatically, because hoses and fittings for every color must be routed along the entire length of the arms, and the fluid delivery equipment itself adds a lot of size and weight to the outer arm.

Another limitation of current painting robots is that they are limited in reach and flexibility due to the placement of the fluid delivery equipment on the moving robot arm along with routing a multitude of paint and control lines to the color changing and fluid pumping equipment. This configuration severely limits flexibility—especially near reach, where the robot is painting close to its mounting point and the arms are folded tightly. A robot's lack of near reach flexibility causes paint spray booths to be designed with a greater clearance than desirable between the vehicles and the spray booth wall, which increases the volume of the spray booth and therefore the cost to environmentally control it. The lack of near reach flexibility also means that the downline distance from one robot to the next is larger than desired, which increases the length and therefore the volume of the spray booth. Furthermore, lack of flexibility means that an individual robot may not be able to paint all of the interior and exterior surfaces on one side of the vehicle, which then requires more robots to be installed on the paint line.

Yet another limitation of current painting robots is that the painting operation must be shut down periodically in order to perform cleaning and maintenance on the robots. Painting robot arms are subject to the inevitable accumulation of paint overspray—especially the parts of the arm nearest the spraying of paint, which are the paint applicator itself and the outer arm near the applicator. In order to prevent the overspray from adversely affecting robot operation, cleaning and maintenance activities must be performed periodically. These maintenance activities—such as cleaning or changing the applicator, changing overspray covers on the robot arms and wiping down windows and cleaner systems—are typically performed every four hours. In order to perform all of these activities, which occur inside the spray booth, a booth zone must be locked out (no vehicle painting) for a cleaning time of about 30 minutes. These cleaning time periods represent paint line down time, and are very costly.

In order to improve the efficiency of vehicle painting operations, and reduce cost and waste, a new painting robot design is needed which addresses the shortcomings discussed above.

SUMMARY

In accordance with the teachings of the present disclosure, a Next Generation Painting Robot with advanced fluid delivery system design, enhanced kinematics and a service airlock compartment is disclosed. The disclosed painting robot includes a fluid delivery system which places color changing valves, cleaning valves and pumping hardware on the back side of the robot's mounting pedestal, where it can be serviced without a technician having to enter the spray booth. The fluid delivery system also allows much smaller and lighter robot arms, and is designed to minimize paint waste and wait time during color changes. The disclosed robot also includes a joint providing redundant inner arm rotation which, combined with the elimination of the color changing and fluid delivery equipment from the robot arms, enables dramatically improved near reach flexibility, which in turn allows a smaller spray booth. The disclosed improved robot painting system provides the ability for routine cleaning and maintenance to be performed without personnel entering the working area of the spray booth and without stopping painting operations, due to simplified outer arm design, remotely mounted fluid delivery equipment and a specially configured airlock booth adjacent to the robot pedestal offering complete serviceability of the entire outer arm of the robot, wrist and applicator.

Additional features of the presently disclosed devices will become apparent from the following description and appended claims, taken in conjunction with the accompanying drawings.

BRIEF DESCRIPTION OF THE DRAWINGS

FIGS. 8A and 8B are schematic diagrams of two different designs of a fluid delivery system including valves and canister pumps used for paint application, cleaning and color change, according to embodiments of the present disclosure;

DETAILED DESCRIPTION OF THE EMBODIMENTS

The following discussion of the embodiments of the disclosure directed to a Next Generation Painting Robot is merely exemplary in nature, and is in no way intended to limit the disclosed devices or their applications or uses. For example, the painting robot is described in the context of painting vehicles on a conveyor line, but the robot is anticipated to find applications painting or processing other types of objects. In respect of the methods disclosed, the steps presented are exemplary in nature, and thus, steps may be added, removed or reordered without departing from the spirit and scope of the invention.

In order to address the shortcomings of the existing painting robots discussed above, an all-new robot has been designed with features including: improved painting efficiency; reduced installed cost per arm; reduced spray booth down time due to robot service and cleaning; increased robot uptime/availability; reduced color change waste; different inner and outer arm link length options; improved near reach flexibility; 2-axis and 3-axis wrist options; and increased paint body transfer efficiency.

Figure 1A:
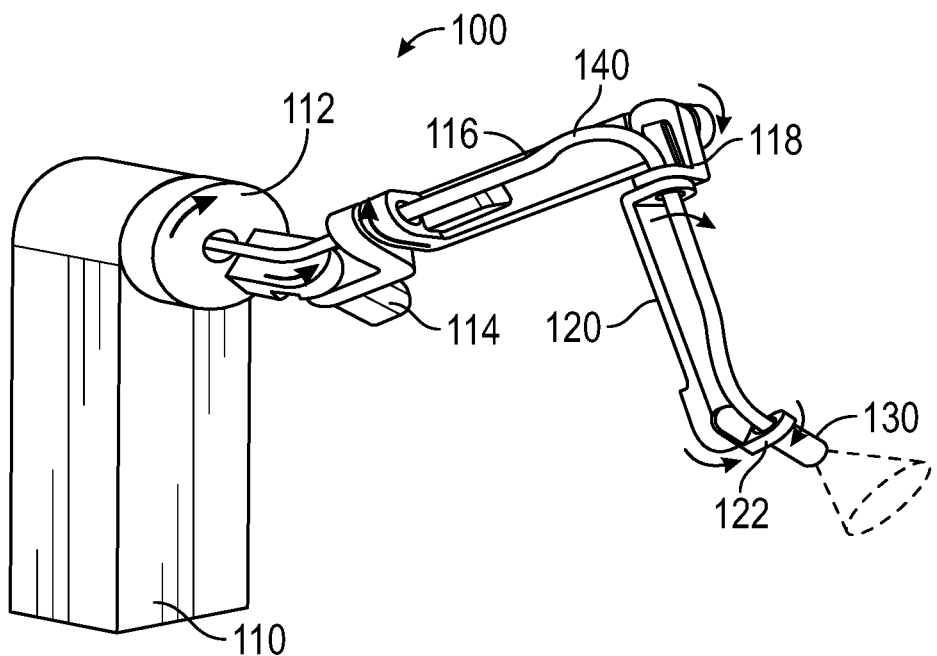
FIG. 1A is an illustration of a 6-axis Next Generation Painting Robot, according to an embodiment of the present disclosure.

FIG. 1A is an illustration of a 6-axis Next Generation Painting Robot 100, according to an embodiment of the present disclosure. The Next Generation Painting Robot 100 is designed to provide the flexibility and serviceability needed to overcome the limitations of prior art painting robots discussed above. The Next Generation Painting Robot allows a vehicle painting process line to be implemented using substantially less spray booth floor space than previous designs, and with dramatically reduced downtime required for maintenance and cleaning.

The 6-axis robot 100 is mounted to a fixed base mounting stand 110. A turret or robot base 112 is rotatably mounted to the mounting stand 110 at a joint J1 (joints identified and numbered in later figures). In one embodiment, the joint J1 has an axis which is substantially horizontal, and perpendicular to the spray booth side wall, a spray booth center plane and the conveyor direction. In other embodiments, the joint J1 has an axis which is generally oriented towards the spray booth center plane but is not horizontal, instead being tilted at an angle such as 30° above horizontal. A first inner arm part 114 is coupled to the turret 112 at a joint J2. All of the joints of the robot 100 are rotational joints providing a single degree of freedom which is rotation about a defined axis, where the permitted rotational motion is shown with an arc arrow in FIG. 1A. A second inner arm part 116 is coupled to the first inner arm part 114 at a joint J3. A first outer arm part 118 is coupled to the second inner arm part 116 at a joint J4, also known as the elbow. A second outer arm part 120 is coupled to the first outer arm part 118 at a joint J5. A wrist part 122 is coupled to the second outer arm part 120 at a joint J6. An applicator 130 is fixedly attached to the wrist part 122 at an angle optimized for paint application.

The Next Generation Painting Robot 100 is optimized for ease of maintenance via placement of fluid delivery devices (pumps, valves, color changers, cleaning circuits, etc.) in or near the mounting stand 110, rather than on the outer arm 120. It can be seen in FIG. 1A that only a single applicator supply line 140 is routed along the robot arms to provide paint to the applicator 130. Through the elimination of multiple paint supply lines from all of the arms, and elimination of pumps and bulk paint supply lines and associated color change valves from the outer arm, all of the arms of the robot 100 are much less bulky and much lighter in weight than prior art painting robots. The slender arms in conjunction with a redundant inner arm rotation (the joint J3), along with other features discussed below, correspondingly result in the robot 100 having much better flexibility—especially near reach flexibility—than prior art painting robots. Additional valves needed for painting and color changing may be located on the end of the robot arm and also in the robot applicator which are simply presented to the operator in the maintenance booth for service.

Figure 1B:
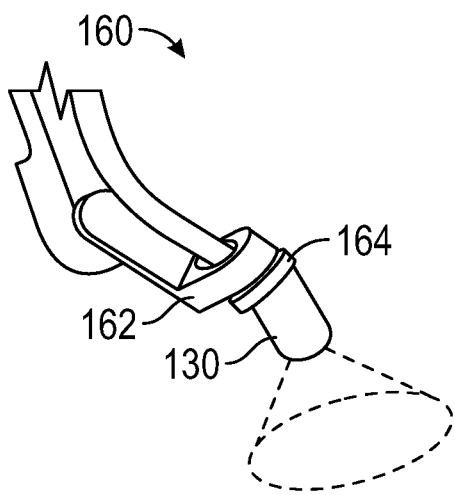
FIG. 1B is an illustration of an optional wrist joint configuration for a 7-axis version of the Next Generation Painting Robot illustrated in FIG. 1A.

FIG. 1B is an illustration of an optional wrist joint configuration for a 7-axis version of the Next Generation Painting Robot 100 of FIG. 1A. The wrist joint 160 includes a first wrist part 162 which takes the place of the wrist part 122 of FIG. 1A. A second wrist part 164 is rotationally coupled to the first wrist part 162, and the applicator 130 is fixedly attached to the second wrist part 164 at an angle optimized for paint application. The 7-axis configuration of FIG. 1B provides an extra degree of freedom for aiming the applicator 130, which may be needed in some painting applications.

Figure 2A:
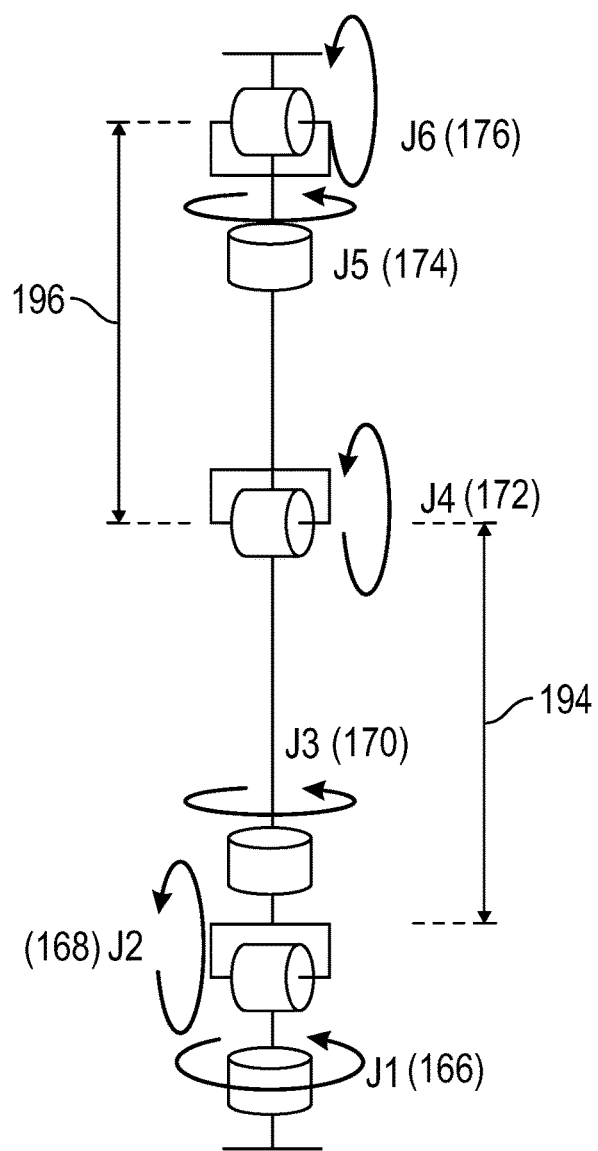
FIGS. 2A and 2B are schematic diagrams illustrating the joint configurations for the 6-axis and 7-axis versions of the Next Generation Painting Robot of FIGS. 1A and 1B.
Figure 2B:
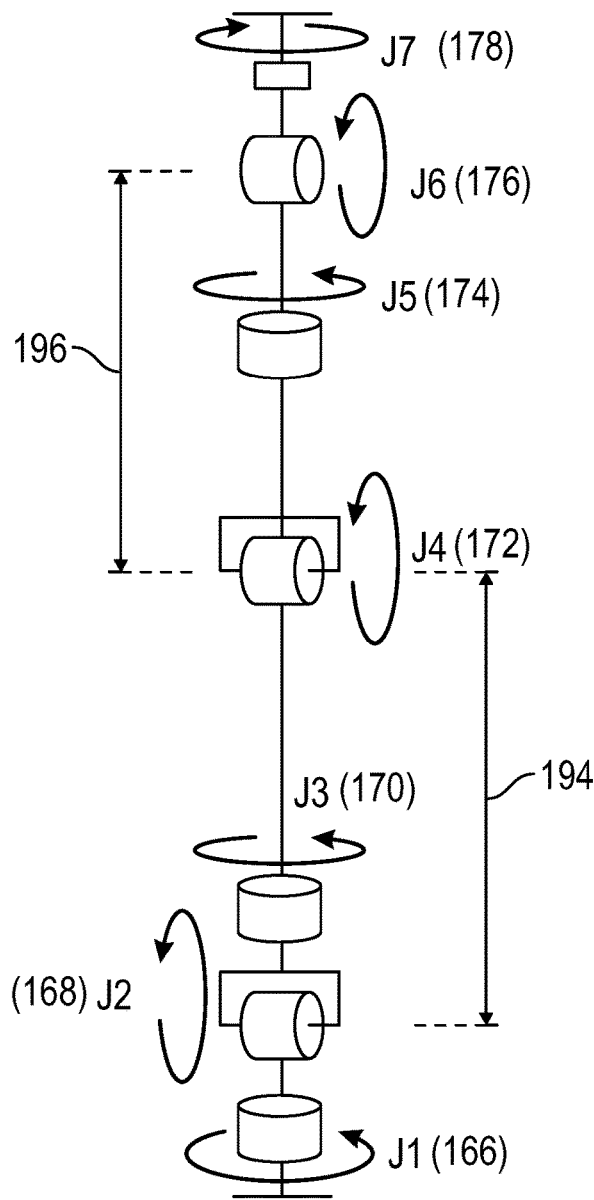

FIGS. 2A/2B are schematic diagrams illustrating the joint configurations for the 6-axis and 7-axis versions of the Next Generation Painting Robot 100 of FIGS. 1A and 1B. As would be understood by one skilled in the art, and as depicted in FIGS. 2A and 2B, the joints J1-J6 are essentially a series of rotational joints with each oriented orthogonally to the previous, and providing alternating rotation and bending motions of one part with respect to another. In FIG. 2A, the joints may be described as follows: J1 (166) provides turret rotation relative to the mounting stand 110; J2 (168) provides bending of the inner arm relative to the turret 112; J3 (170) provides "redundant" rotation of the inner arm relative to the turret 112; J4 (172) is the elbow joint providing bending of the outer arm relative to the inner arm; J5 (174) provides rotation of the outer arm; and J6 (176) provides bending at the wrist. The final rotation of the wrist, also called the spin axis, is shown as J7 (178) in FIG. 2B.

In both the 6-axis and 7-axis configurations, an inner arm length 194 is defined as a distance from the J2 (168) to the J4 (172), and an outer arm length 196 is defined as a distance from the J4 (172) to the J6 (176). The inner arm length 194 and the outer arm length 196 are key design parameters of the Next Generation Painting Robot 100, as the arm lengths 194 and 196 affect the reach of the robot 100. The overall length of the applicator supply line 140 relative to the combined arm lengths is also an important design factor.

Through the kinematics described above, and the placement of fluid delivery devices upstream of the robot arms (in or near the mounting stand 110), the Next Generation Painting Robot 100 provides many improvements over existing painting robots. The robot 100 substantially reduces the weight of the robot arm and associated installation cost. The robot 100 also provides a large useful work envelope with a fixed-base robot. It can process continuously upstream-to-downstream with the freedom and near-reach flexibility to maintain the arms within the narrow space between the car body and booth wall. In addition, the robot 100 provides a means to route at least one paint supply line through the joints to the applicator so as to not restrict the robot's joint travel range. Furthermore, the Next Generation Painting Robot 100 is designed to minimize downtime of the paint line due to required cleaning and maintenance of the robot 100. All of these aspects of the Next Generation Painting Robot 100 are discussed in detail below.

The following discussion of FIGS. 3-6 describes the use of the robots 100 in a spray booth, including a new fluid delivery circuit designed to simplify component replacement and service. FIGS. 7-8 depict the details of several fluid delivery circuits, and illustrate how color change times and paint waste are minimized while realizing all of the benefits of the majority of fluid delivery component placement outside the spray booth.

Figure 3:
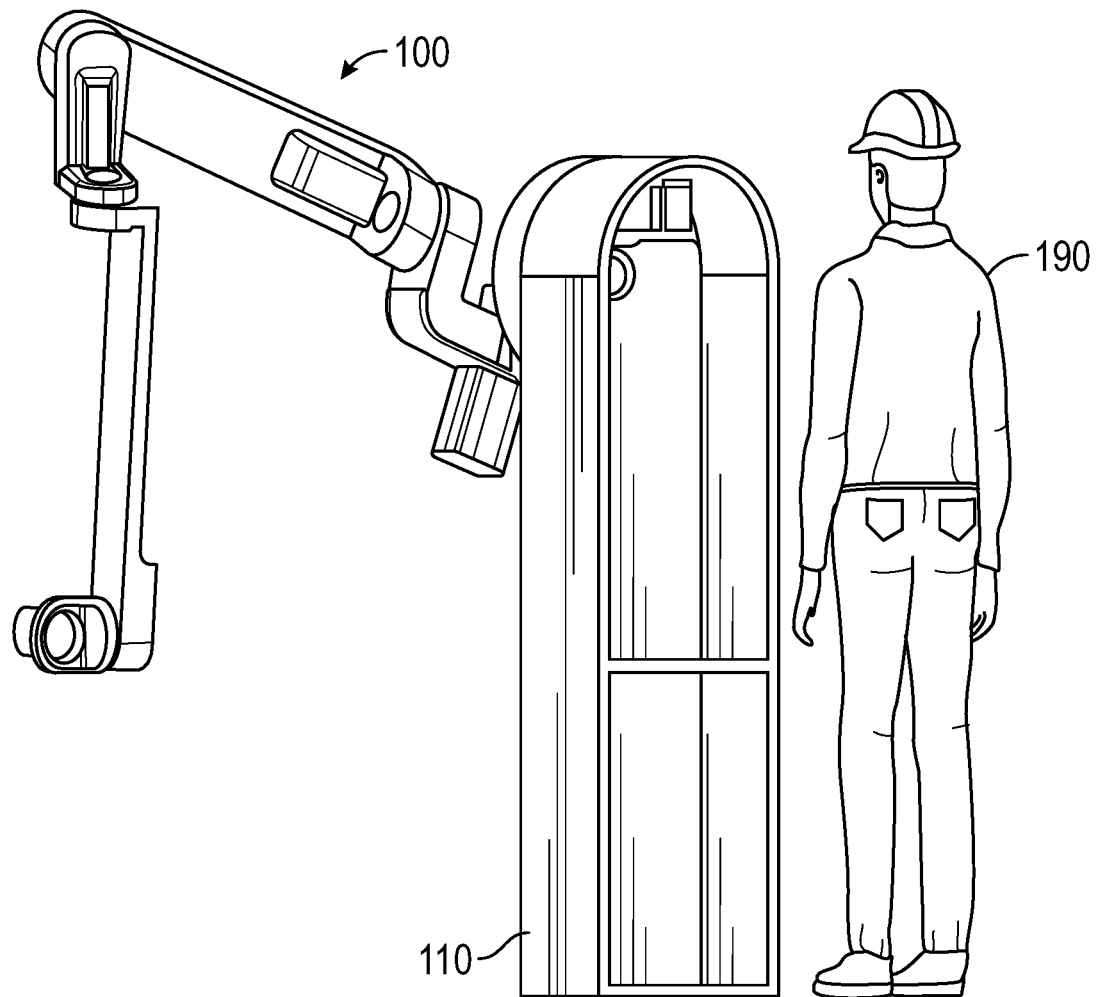
FIG. 3 is an illustration of the Next Generation Painting Robot of FIG. 1 as viewed from an operator aisle outside the spray booth, where the back side of a mounting stand serves as a cabinet for fluid delivery, pneumatic and electrical control equipment.

FIG. 3 is an illustration of the Next Generation Painting Robot 100 as viewed from an operator aisle outside the spray booth, with an operator 190 standing near the mounting stand 110.

Figure 4:
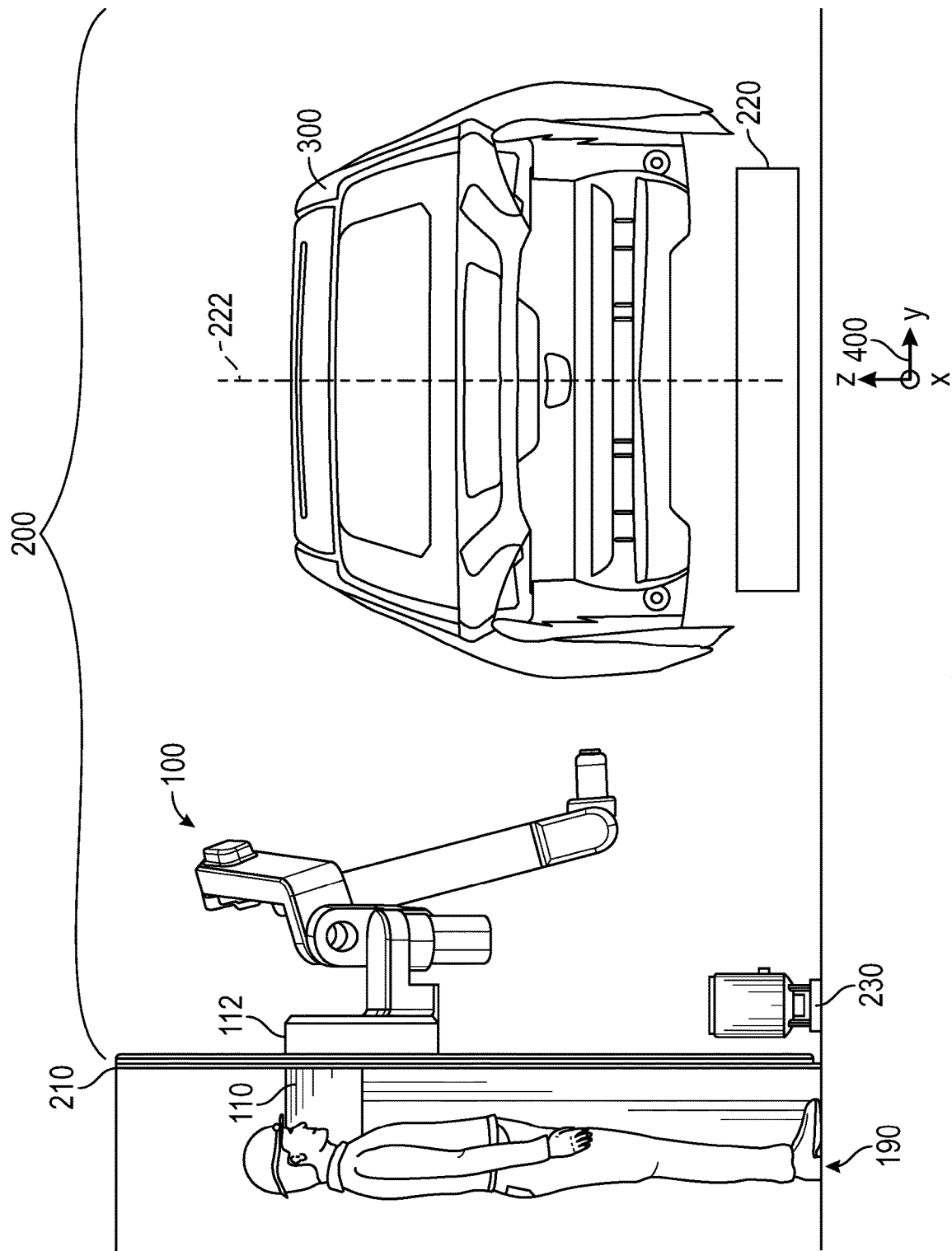
FIG. 4 is an illustration of the Next Generation Painting Robot of FIG. 1 in an end view, where the robot and a vehicle being painted are inside the spray booth, and an operator and the mounting stand are positioned outside a wall of the spray booth, according to an embodiment of the present disclosure.

FIG. 4 is an illustration of the Next Generation Painting Robot 100 in a spray booth end view, where the robot 100 and a vehicle 300 being painted are inside a spray booth 200, and the operator 190 and the mounting stand 110 are positioned outside a side wall 210 of the spray booth 200. A conveyor 220 carries vehicle bodies—either in continuous motion or stop station conveyance—through the booth 200. The motion of the vehicle 300 on the conveyor 220 is toward the viewer in FIG. 4. A spray booth center plane 222 is seen in edge view, where the center plane 222 is centered between the wall 210 and an opposing wall (not shown) of the spray booth 200. In the embodiment of FIG. 4, the joint J1 between the turret 112 and the mounting stand 110 has an axis of rotation which is horizontal, however, this axis may be tilted from the horizontal for some applications.

It is to be understood (and it is shown in later figures) that additional instances of the robot 100 are positioned along the side wall 210 and along the opposite side wall, providing a paint booth capable of continuous painting of vehicles or other parts moving along on the conveyor 220. A cleaning stand 230 is located adjacent the robot 100 inside the spray booth 200 near the side wall 210, directly opposite the operator's position. The robot 100 returns to a home or service position for color change flush and cleaning tasks, in which configuration the applicator 130 is positioned on top of the cleaning stand 230. This is discussed further below.

Figure 5:
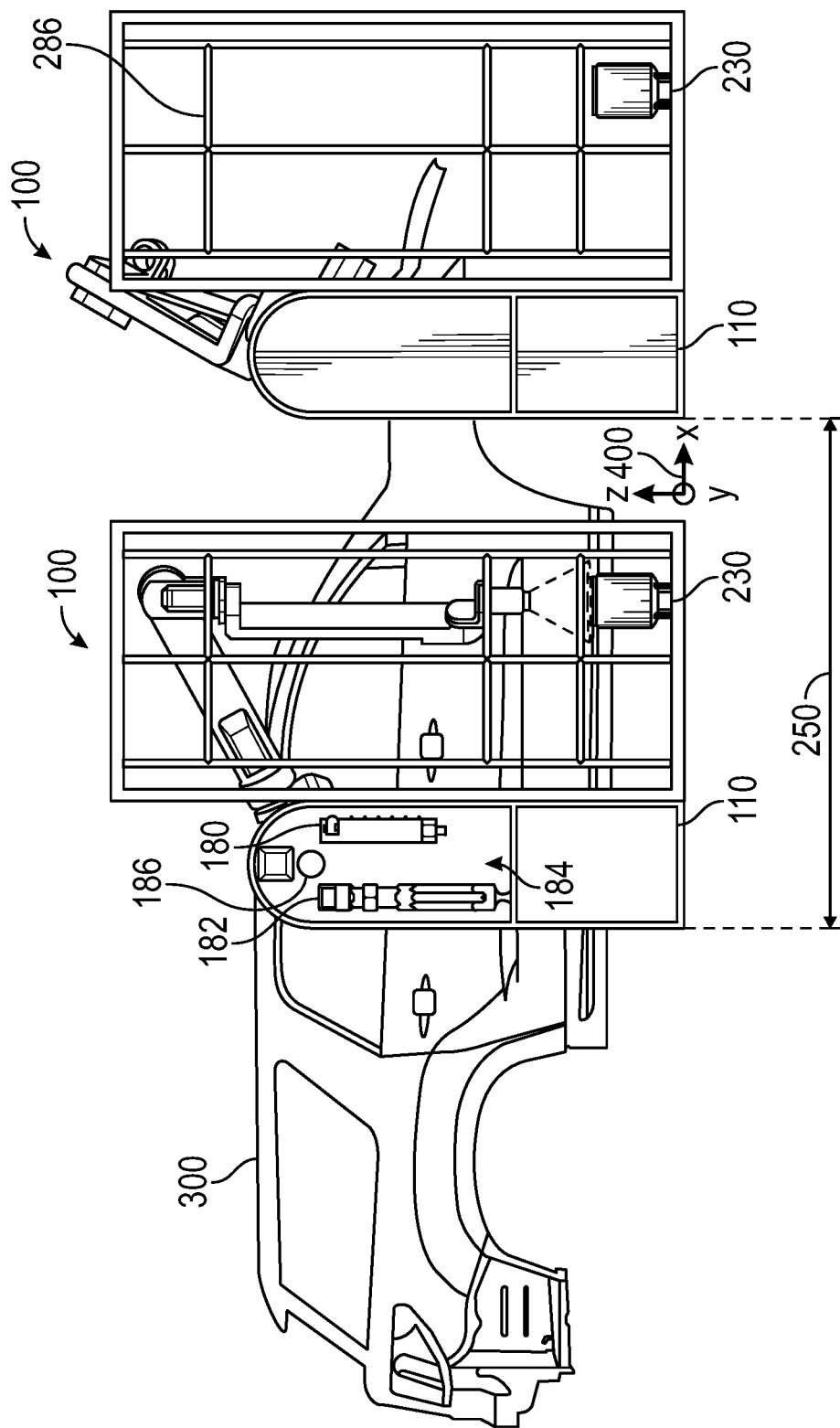
FIG. 5 is a side view illustration of two of the Next Generation Painting Robots with the fluid delivery equipment visible inside the cabinet on the back side of the mounting stand of one of the robots.

FIG. 5 is a side view illustration of a painting process line showing two of the Next Generation Painting Robots 100 with the fluid delivery equipment visible inside a cabinet on the back side of the mounting stand 110 of one of the robots 100. In FIG. 5, one of the robots 100 (on the right) is painting the hood of the vehicle 300, while the other robot 100 is parked at its home or service position at the cleaning stand 230. The mounting stand 110 on the right has covers in place which hides the fluid delivery and pneumatic equipment inside the cabinet. In FIG. 5, portions of the vehicle 300 and the robots 100 are visible through windows, while the remainder of the side wall 210 is omitted.

As discussed earlier, the Next Generation Painting Robot 100 is designed with the fluid delivery equipment upstream of the robot arms, which yields great benefits in terms of robot arm size and weight reduction, robot flexibility, support of many paint colors, and serviceability of components. In a preferred embodiment, a color changer 180 and a pumping device 182 are located in a cabinet 184 on the back side (the operator aisle side, not inside the spray booth 200) of the mounting stand 110. The color changer 180 has many paint supply lines (typically 48 or more—not shown) carrying different colors of paint, and includes automatically controlled valves which select one of the paint colors for provision to the pumping device 182 via a first supply line (not shown). The pumping device may be a canister-type device, a gear pump device, or other design suitable for pumping the paint to the applicator 130. The applicator supply line 140 (shown in FIG. 1) receives the paint from the pumping device 182 and provides the paint to the applicator 130. The applicator supply line 140 passes through a hole 186 in the mounting stand 110, through a hole in the turret 112 at joint J1, and along the robot arms to the applicator 130, optionally also passing through other joints (such as J3 and J5) along the way. Multiple pumps and multiple supply lines (not shown) could be used.

In other design embodiments, the color changer 180 and the pumping device 182 may be located elsewhere—preferably on or near the robot base, not on or near the outer arm. For example, the color changer 180 and the pumping device 182 may both be mounted on the turret 112. Alternately, the color changer 180 may be mounted in the cabinet 184 and the pumping device 182 may be mounted on the turret 112 or the first inner arm part 114. In any case, the color changer 180 and the pumping device 182 are advantageously positioned so that they can be accessed from the operator aisle (possibly through a small port hole in the wall 210) in the event that they need to be serviced or replaced. Spray booth productivity is dramatically improved by avoiding downtime for servicing of fluid delivery equipment, through the design of the Next Generation Painting Robot 100.

In FIG. 5, a distance 250 represents the pitch or spacing between adjacent robots 100, where it is to be understood that many (more than two) of the robots 100 would be installed along each side of the spray booth 200. The spacing distance 250 and its impact on the size of the spray booth 200 are discussed further below. A safety interlocked intrusion gate (or barrier, or guard) 286 is offered to prevent the operator 190 from entering the spray booth 200, while still allowing the operator 190 to reach into a protected zone; this is discussed further below.

Figure 6:
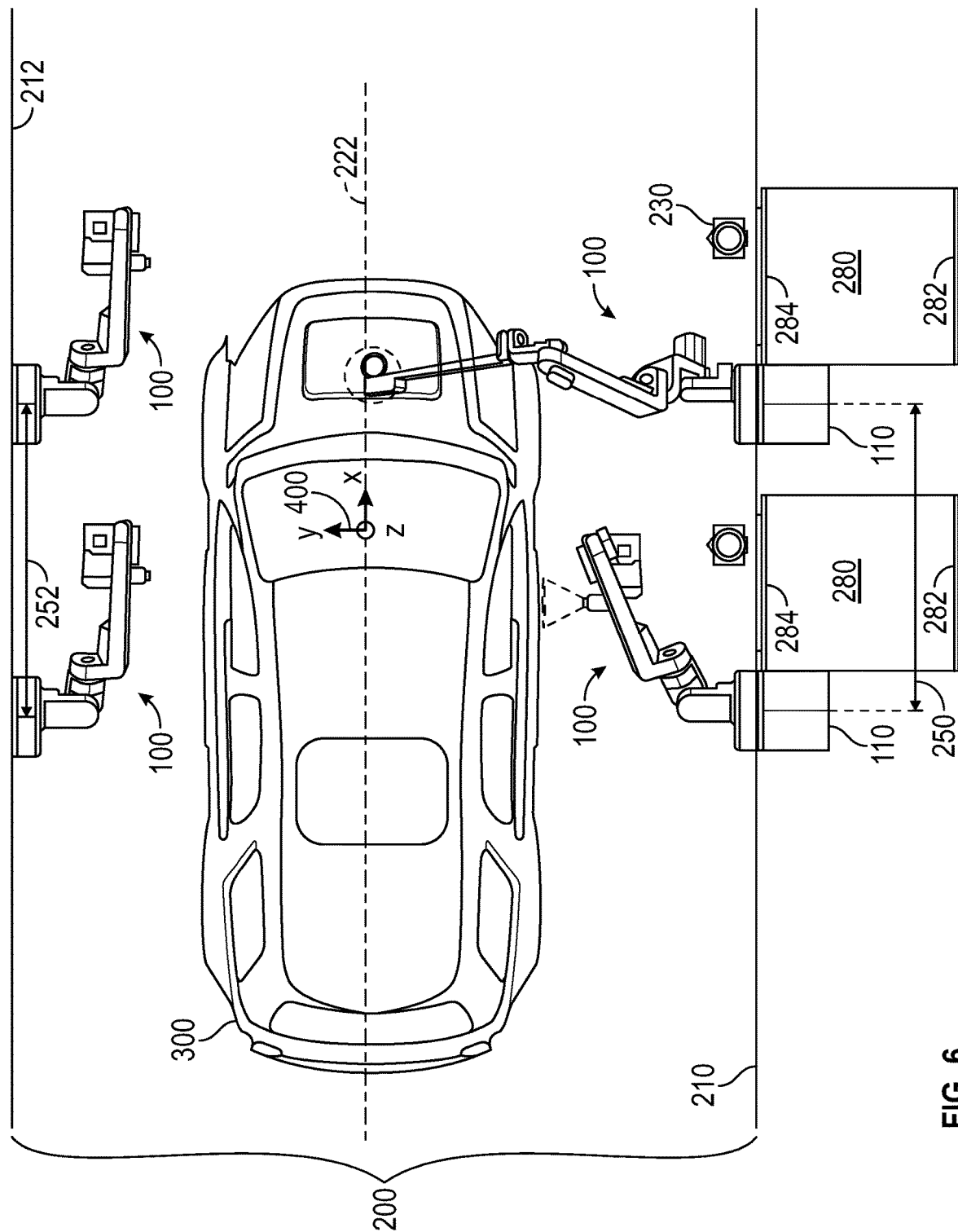
FIG. 6 is a top view illustration of two of the Next Generation Painting Robots simultaneously painting different parts of a vehicle in the spray booth, further illustrating robot and spray booth configuration.

FIG. 6 is a top view illustration of a painting process line showing two of the Next Generation Painting Robots 100 simultaneously painting different parts of the vehicle 300 in the spray booth 200. In FIG. 6, one of the robots 100 is painting the right front door of the vehicle 300, and the other robot 100 is painting the hood of the vehicle 300. The booth center plane 222 is visible in top edge view in FIG. 6, positioned midway between the side wall 210 and an opposite side wall 212. Additional instances of the robot 100 are installed along the opposite side wall 212, as discussed below.

Also visible in FIG. 6 is an airlock booth 280 adjacent to the mounting stand 110 of each of the robots 100. Each airlock booth 280 has an aisle entry door 282 and a booth entry door 284. In a procedure discussed further below, service personnel (who may optionally don a self-contained breathing apparatus or umbilical breathing hose) can enter the airlock booth 280, close the aisle entry door 282, open the booth entry door 284, and perform certain cleaning and maintenance tasks on the robot 100—without having to stop all painting operations and flush the spray booth 200 with fresh air.

In FIGS. 4-6, a spray booth coordinate frame 400 is shown. The spray booth coordinate frame 400 has an origin at a point in the spray booth center plane 222, at a height typically below the conveyor 220. The coordinate frame 400 has an X-axis oriented in the direction of movement of the conveyor 220 (from left to right in FIGS. 5 and 6), and a Z-axis oriented upward. This makes the X-Z plane of the coordinate frame 400 coincident with the spray booth center plane 222, as shown in FIGS. 4 and 6. The coordinate frame 400 has a Y-axis oriented toward the opposite side wall 212 (away from the side wall 210) of the spray booth 200. This makes the X-Y plane of the coordinate frame 400 a horizontal plane, such as a plane coincident with the floor of the spray booth 200.

In FIGS. 5 and 6, the spacing distance 250 illustrates the pitch or spacing between the robots 100 along the side wall 210. Because of the near reach flexibility of the Next Generation Painting Robot 100 (owing to the arm kinematics, placement of fluid delivery equipment in the mounting stand, slender arm construction, etc.), the distance 250 may be as little as 1.5-2.0 meters. A distance 252 is the spacing between the robots 100 on the opposite side wall 212, where the distance 252 may be different from the distance 250. For example, in one design configuration of the spray booth 200, the robots 100 along the side wall 210 may be placed with the spacing distance 250 minimized and these robots being responsible for painting the near side surfaces and all of the cross-car exterior surfaces (hood, roof, liftgate) of the vehicle 300, while the robots 100 along the opposite side wall 212 are placed with the spacing distance 252 greater than the distance 250 and these robots being responsible for painting only their near side portions of the vehicle 300.

FIGS. 3-6 provide a thorough depiction of the robot 100 and how many of such robots are used in a painting process line. By virtue of the advanced kinematics and the placement of fluid delivery devices upstream of the robot arms, the Next Generation Painting Robot 100 substantially reduces the weight and bulk of the robot arm, provides improved flexibility and near reach, and is designed to minimize downtime of the paint line due to required cleaning and maintenance of the robot 100. While delivering all of the above benefits, the Next Generation Painting Robot 100 also minimizes waste paint and cycle time during color change operations, using advanced fluid delivery circuits discussed below.

Another key benefit of the Next Generation Painting Robot 100 as depicted in FIGS. 1-6 is the minimization of the length of the applicator supply line 140. By routing the applicator supply line 140 through the center of some joints, and due to the slender design of the robot arms, the length of the applicator supply line 140 may be kept to a length less than the combined lengths of the inner and outer arms (194 & 196 of FIG. 2) plus a service length of 1.6 meters. This supply line length minimization is important both from the standpoint of maintaining adequate paint pressure at the applicator 130, and also from the standpoint of minimization of color change paint waste. Where further reduction of color change time is required, multiple pumping systems and fluid supply lines as shown in FIGS. 7 and 8 can be used.

Figure 7A:
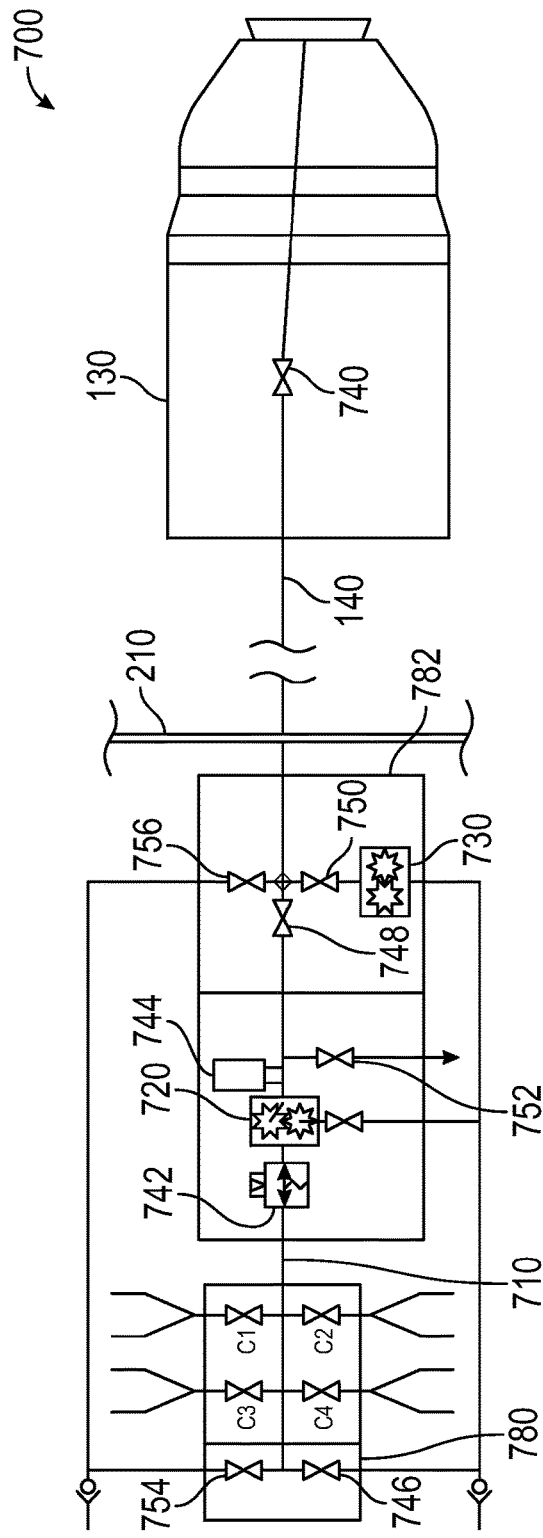
FIGS. 7A and 7B are schematic diagrams of two different designs of a fluid delivery system including valves and gear pumps used for paint application, cleaning and color change, according to embodiments of the present disclosure.

FIG. 7A is a schematic diagram of a fluid delivery system 700 used for paint application, cleaning and color change, according to an embodiment of the present disclosure. The fluid delivery system 700 includes a color changer 780 which represents the color changer 180 of FIG. 5, and a pumping device 782 which represents the pumping device 182 of FIG. 5. The color changer 780 and the pumping device 782 are specifically designed for many types of paints. Also visible in FIG. 7 are the applicator supply line 140 and the applicator 130 discussed earlier. The color changer 780 and the pumping device 782 are located outside the spray booth 200, and the applicator supply line 140 passes through the side wall 210 and is routed along the robot arms to the entry point of the applicator 130. In all of the embodiments of FIGS. 7 and 8, the length of applicator supply line 140 from the pumping device to the applicator 130 is less than 4.4 meters.

The solvent based fluid delivery system 700 supports a multitude of colors in the color changer 780, is capable of completing a color change in 15 seconds, limits wasted paint for a color change, and limits wasted solvent for a color change. The fluid delivery system 700 delivers these capabilities through the use of two gear pumps—one for paint, and another for solvent—and a series of valves for air, paint and solvent, along with an optimized valve control strategy.

The fluid delivery system 700 operates as follows. One of the valves in the color changer 780 is opened and provides paint of a particular color through a first supply line 710 to the pumping device 782. A first gear pump 720 pumps the paint through the applicator supply line 140 to the applicator 130, where a trigger valve 740 controls the actual spraying of paint from the applicator 130. A pressure regulator 742 is provided upstream of the first gear pump 720, and a pressure sensor 744 is provided downstream of the first gear pump 720. It is to be understood that the pumps and valves are all operated by a controller having a processor, where the controller controls motion of the robot, actual spraying of paint via the trigger valve 740, initiation of the color change sequence discussed here, etc.

When painting of the current color is nearing completion, the paint valve (C1 for example) is closed to stop the flow of paint from the color changer 780. While painting by the applicator 130 continues, a solvent valve 746 is then opened to push the paint in the first supply line 710 almost to, but not into, the first gear pump 720. At that time, the first gear pump 720 is stopped, a valve 748 is closed, a valve 750 is opened, and a second gear pump 730 is activated to pump solvent into the supply line 140. The second gear pump 730 is a high-efficiency pump designed with tight tolerances for pumping low viscosity solvent. While painting by the applicator 130 continues, the second gear pump 730 pushes the paint in the applicator supply line 140 out to the applicator 130, where most of the paint can be used for painting the vehicle. Flow of the solvent is metered by the pump 730 to determine when the solvent has almost reached the applicator 130. Toward the end of the painting cycle when the solvent pushout function occurs the color changer 780, fluid regulator 742, gear pump 720, and paint pressure sensor 744, are cleaned and primed with the next color through dump valve 752 by sequencing the color changer solvent and air valves and finally opening the next color valve.

Upon completion of the part painting, the robot 100 returns to home position where the applicator 130 enters the applicator cleaner 230. There, solvent from the second gear pump 730 pushes the remainder of the paint out of the applicator supply line 140 and the applicator 130. At the same time, solvent from the pump 730 is also used to flush the short passage between the first gear pump 720 and the valve 748, with residuals flushed out through a dump valve 752. Compressed air is then provided through air valve 756 to dry the solvent out of the applicator supply line 140 and the applicator 130. The applicator supply line 140 is then primed with the next color using the pump 720 to precisely meter the paint to the applicator 130 and through the trigger valve 740 and into the applicator cleaner 230. The robot 100 then returns to the home or service position where the applicator 130 is now ready to paint the next job.

Figure 7B:
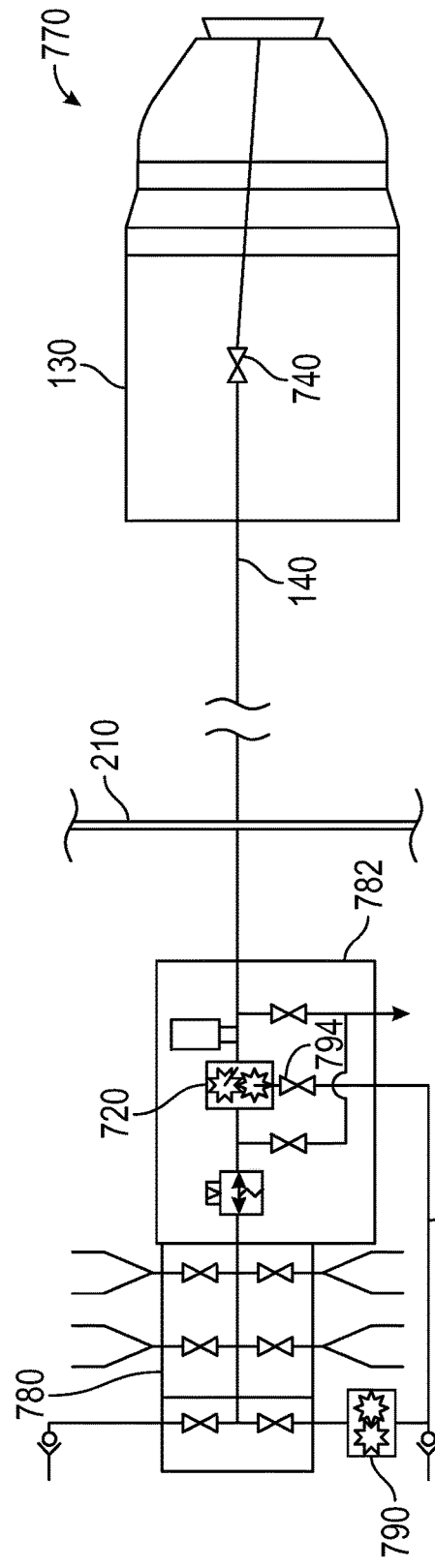

FIG. 7B is a schematic diagram of a fluid delivery system 770 used for solvent based paint application, cleaning and color change, according to another embodiment of the present disclosure. The fluid delivery system 770 differs from the system 700 of FIG. 7A mainly in the location and connectivity of the solvent pump. In the system 770, a second gear pump 790 (a high-efficiency pump designed with tight tolerances for pumping low viscosity solvent) is positioned upstream of the first gear pump 720. When it is time for a color change, the flow of paint from the color changer 780 is cut off, and the second gear pump 790 provides solvent through a line 792 directly to the first gear pump 720 which continues to operate. The solvent thus provided begins cleaning the first gear pump 720 while also pushing the paint through the applicator supply line 140 to the applicator 130. When the solvent in the applicator supply line 140 nearly reaches the applicator 130, the robot 100 returns the applicator 130 to the applicator cleaner 230 and the system 770 completes its clean-out cycle, using valves to provide the required flow of solvent and then compressed air in a manner similar to that discussed for the system 700.

In yet another alternate embodiment, a pressure regulator and a flow meter could be used in place of the second gear pump 730 or 790 to meter the flow of solvent used in pushing the paint out of the applicator supply line 140.

As outlined above, the fluid delivery systems 700 and 770 enable the placement of the color changer 780 and the pumping device 782 upstream of the robot while still minimizing color change time and wasted paint. This placement upstream of the robot, outside the spray booth and therefore serviceable from the operator aisle in some embodiments, is a key enabler of increased paint operations uptime.

FIG. 8A is a schematic diagram of a fluid delivery system 800 including valves and canister pumps used for paint application, cleaning and color change, according to an embodiment of the present disclosure. The fluid delivery system 800 includes a color changer 880 which represents the color changer 180 of FIG. 5, and a pumping device 882 which represents the pumping device 182 of FIG. 5. The color changer 880 and the pumping device 882 are designed for water based paints, while also providing the option to use solvent based paints and migrate to water based paints, e.g. both used in a single painting application. Also visible in FIG. 8A are the applicator supply line 140 and the applicator 130 discussed earlier, where the applicator 130 is located inside the spray booth 200, the color changer 880 and the pumping device 882 are located outside the spray booth 200, and the applicator supply line 140 passes through a hole in the side wall 210.

The fluid delivery system 800 supports up to 48 different colors in the color changer 880, is capable of completing a color change in less than 15 seconds, limits wasted paint for a color change to less than 10 cc, and limits wasted solvent for a color change to less than 150 cc. The fluid delivery system 800 delivers these capabilities through the use of two canister pumps—a large canister for paint, and a smaller canister for solvent—and a series of valves for air, paint and solvent, along with an optimized valve control strategy. When the need for a faster color change is required, the system can be duplicated having two independent pumping systems and two fluid supply lines to the applicator. While one system is painting the other can be readying the next color for the next vehicle.

The fluid delivery system 800 operates as follows. One of the valves C1-C4 in the color changer 880 is opened and provides paint of a particular color through a first supply line 810 to the pumping device 882. A paint canister 820 draws back its piston 822 with valve 824 open, thus filling the paint canister 820 with a paint charge of a desired volume for the painting application. The valve 824 is then closed and a valve 826 is opened, and the piston 822 is actuated (plunged) at a prescribed rate in order to deliver paint at a desired flow rate to the applicator 130, where a valve 832 is opened to apply paint to the vehicle.

When painting of the current color is nearing completion and the paint canister 820 is empty, the paint valve 826 is closed and a solvent valve 834 is opened; a solvent canister 830 then actuates (plunges) at a controlled rate, where a charge of solvent pushes the paint in the applicator supply line 140 out to the applicator 130, where most of the paint can be used for painting the vehicle.

The robot 100 then returns to home/service position where the applicator 130 enters the applicator cleaner 230. Simultaneously, the valves 844, 824, 842 and 826 are opened and solvent and air valves 840 and 850 are sequenced to clean and dry the open circuit including the paint canister 820 through dump valve 844. Once in the cleaning station, solvent from the solvent canister 830 pushes the remainder of the paint out of the applicator supply line 140 and the applicator 130.

The canister 820 is then ready for a new paint color, where the system 800 is first subjected to a vacuum and then one of the paint color valves C1-C4 in the color changer 880 is opened; the canister 820 draws the suitable amount of paint and the fluid delivery system 800 is then fully primed with the new paint color. While the canister 820 is being loaded with the next color, the solvent canister 830 draws a new charge of solvent and then the applicator supply line 140 is dried in preparation for the next filling. The piston 822 moves forward to load a small amount of the new paint color to the applicator 130 while still in the applicator cleaner 230. The robot 100 then leaves the applicator cleaner 230, proceeds to the home position and subsequently resumes painting.

FIG. 8B is a schematic diagram of a fluid delivery system 870 used for water based paint application, cleaning and color change, according to another embodiment of the present disclosure. The fluid delivery system 870 differs from the system 800 of FIG. 8A mainly in the location and connectivity of the solvent pump. In the system 870, the solvent canister 830 is positioned adjacent to the paint canister 820. This enables at least one fewer valve to be used in the pumping device 882 in order to provide paint to the paint canister 820 and solvent to both the paint canister 820 and the solvent canister 830.

As outlined above, the fluid delivery systems 800 and 870 enable the placement of the color changer 880 and the pumping device 882 upstream of the robot where they can be serviced without shutting down all painting operations in the spray booth 200, while still minimizing color change time and wasted paint.

Figure 9:
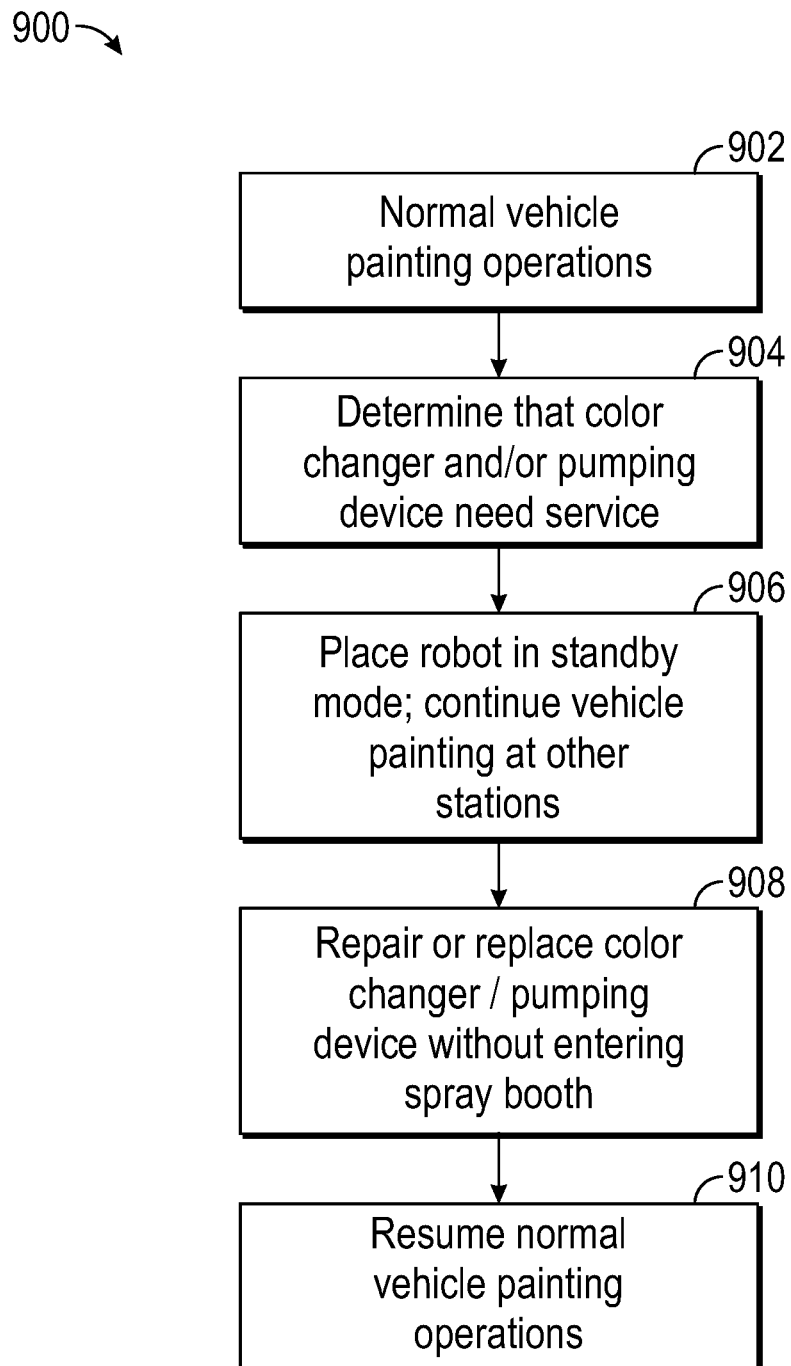
FIG. 9 is a flowchart diagram of a method for paint application and system maintenance using the fluid delivery systems shown in FIGS. 7-8 and the Next Generation Painting Robot of FIGS. 1-6.

FIG. 9 is a flowchart diagram 900 of a method for paint application and system maintenance using the fluid delivery systems shown in FIGS. 7-8 and the Next Generation Painting Robot 100 detailed in FIGS. 1-6. At box 902, normal vehicle painting operations proceed, including applying a coat of paint or primer to a portion of a vehicle body, automatically flushing the fluid delivery system, switching to a different color of paint (or clear coat), and applying another coat to the vehicle.

At box 904, it is determined that color changer device 180 and/or the pumping device 182 (FIG. 5) need to be serviced or replaced. At box 906, the robot 100 is placed in a standby or backup mode, where the particular robot 100 ceases vehicle painting and returns to its home and service position, but the conveyor continues moving vehicle bodies through the spray booth 200 and painting continues at all other stations except the particular robot 100 which is in standby mode. When one of the robots 100 is in standby mode, a painting process line master controller causes other robots 100 to perform the painting work that is not being performed by the robot 100 which is in standby mode.

At box 908, a service technician removes the color changer device 180 and/or the pumping device 182 from the cabinet 184 (FIG. 5) and either replaces or performs service on the removed component. A key advantage of the robot 100—including the fluid delivery system and the overall paint process line designed to accommodate them—is that the repair or replacement of the color changer device 180 and/or the pumping device 182 is performed without the service technician having to enter the spray booth 200. This enables painting operations to continue at all other stations, and avoids having to flush the spray booth 200 with fresh air, both of which are major productivity enhancement and money saving benefits for the vehicle manufacturer.

At box 910, after component repair or replacement by the technician, the robot 100 performs a return to service procedure, is placed back in normal mode, and resumes regular vehicle painting operations. The return to service procedure may include exercising some of the valves in the color changer device 180 and the pumping device 182, flushing the system with solvent and priming the system with the next paint color that is needed.

The preceding discussion describes the features of the Next Generation Painting Robot 100 which enable the color changer device 180 and the pumping device 182 to be serviced without the technician having to enter the spray booth 200. Another feature of the Next Generation Painting Robot 100 is its improved near reach flexibility, which enables a smaller spray booth configuration than was previously possible. This is discussed in detail below.

Figure 10:
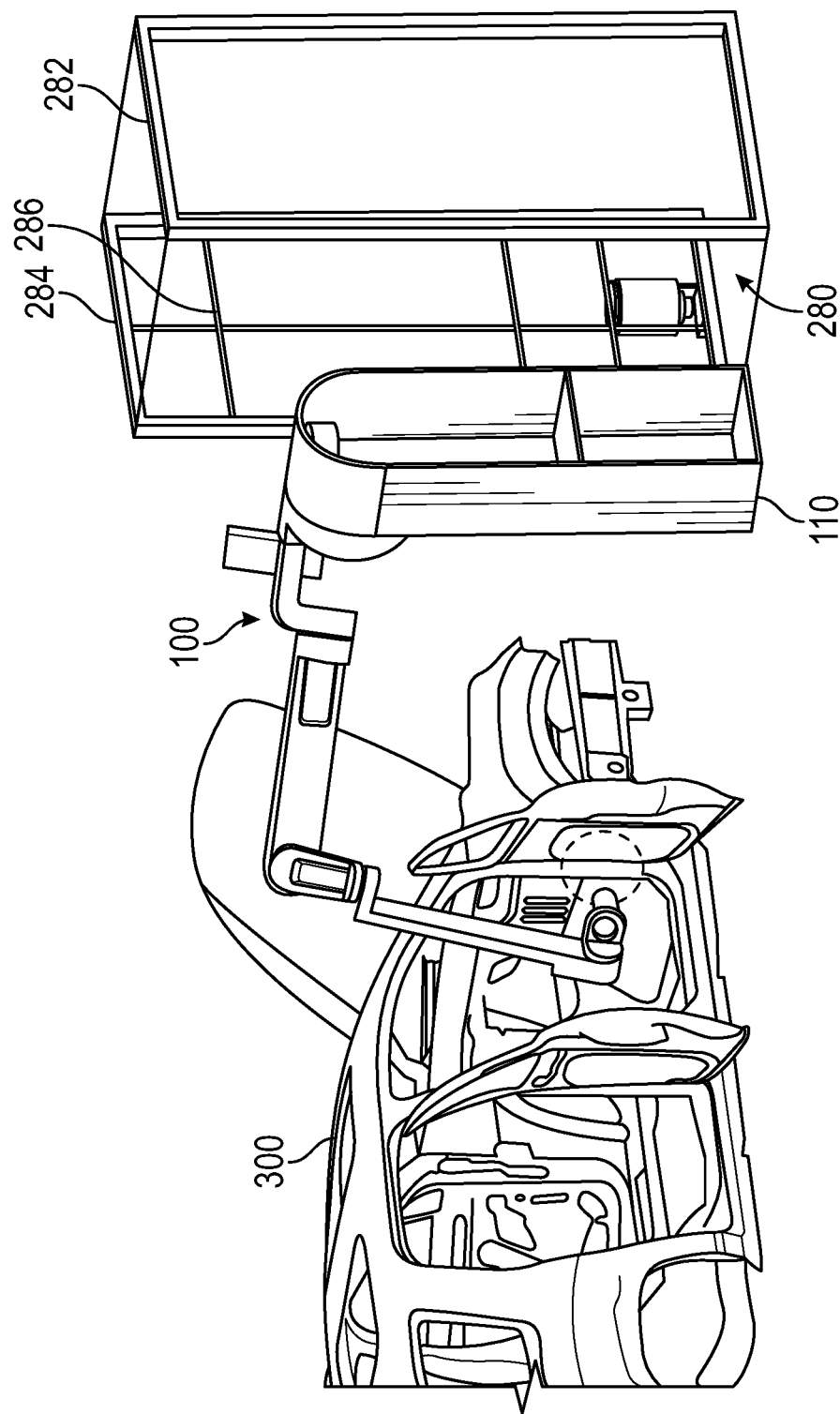
FIG. 10 is an illustration of the Next Generation Painting Robot painting a passenger front door interior section of a vehicle, according to an embodiment of the present disclosure.

FIG. 10 is an illustration of the Next Generation Painting Robot 100 painting an interior of a front passenger-side door of the vehicle 300. Also visible in FIG. 10 are the airlock booth 280 adjacent to the mounting stand 110, the aisle entry door 282, the booth entry door 284, and the guard barrier 286, shown in FIGS. 5 and 6 and discussed previously.

The Next Generation Painting Robot 100 is designed to optimize the processing efficiency of the painting process line and the space efficiency of the spray booth 200. Key enablers of these design goals are the redundant rotation of the inner arm (joint J3), and the availability of two- and three-axis wrist options which provide flexibility for both interior and exterior painting applications. Furthermore, removing the fluid delivery equipment and multiple paint supply lines from the robot arms permits a highly flexible painting robot with significantly improved near reach.

Having higher flexibility and improved near reach, the J2 axis (turret to inner arm first part) can be mounted lower in the spray booth and closer to the vehicle 300. Arm length, arm mass, and supporting structure are thereby greatly reduced when compared to a painting robot with fluid delivery equipment and multiple paint supply lines on the arms. Higher flexibility and improved near reach allows the robot 100 to paint upstream, downstream, and directly in front of itself. This reduces the space between robots (spacing distance 250—shown previously in FIG. 5) from about 3 meters in previous painting robot systems to a distance of 1.5-2.0 meters in systems using the Next Generation Painting Robot 100, reducing booth length and width of the spray booth without overcrowding the working envelopes of adjacent robots. Gun-on efficiency is also improved.

As shown in FIGS. 5, 6 and 10, the Next Generation Painting Robot 100 is capable of painting near-side exterior surfaces of the vehicle 300, along with cross-car surfaces and interior surfaces. Because of the flexibility and reach characteristics of the robot 100, paint process line length can be reduced as much as 30%; additionally, the flexible work envelope permits working in a narrower booth, thereby reducing booth area by 40%, as discussed below. The smaller spray booth footprint and enclosed volume provide significant capital and operational cost savings to the vehicle manufacturer.

Figure 11A:
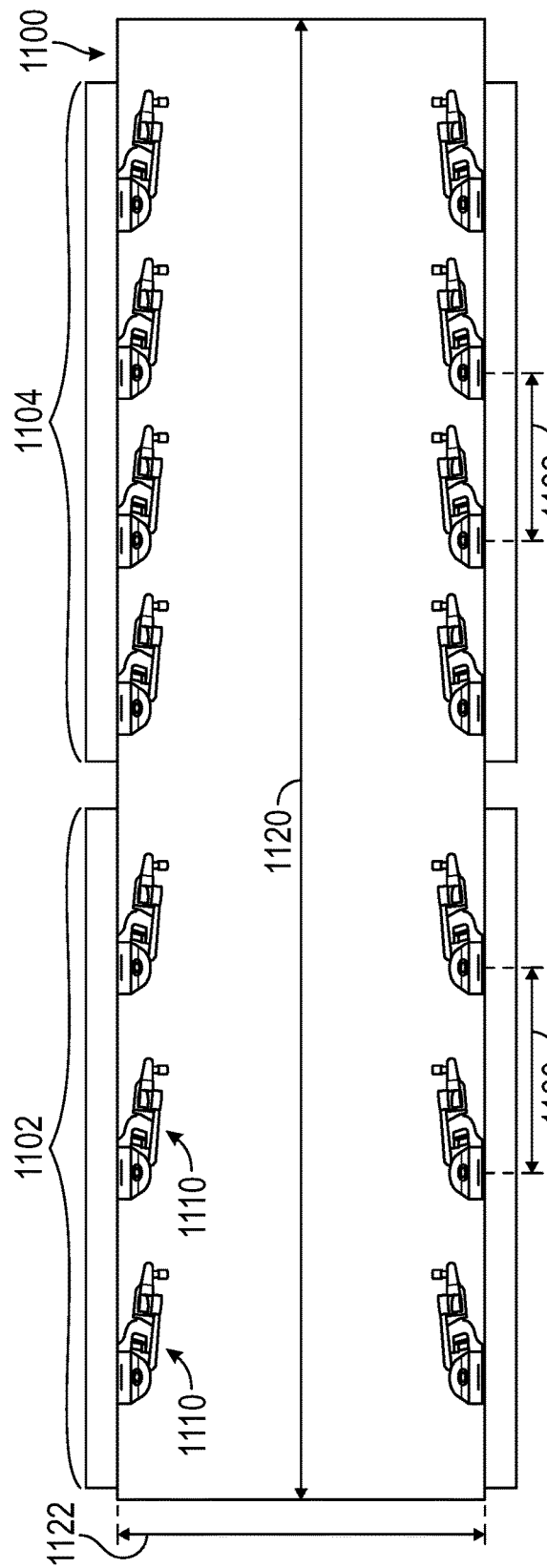
FIG. 11A is a diagram of a painting process line designed to use a previous generation of painting robots.
Figure 11B:
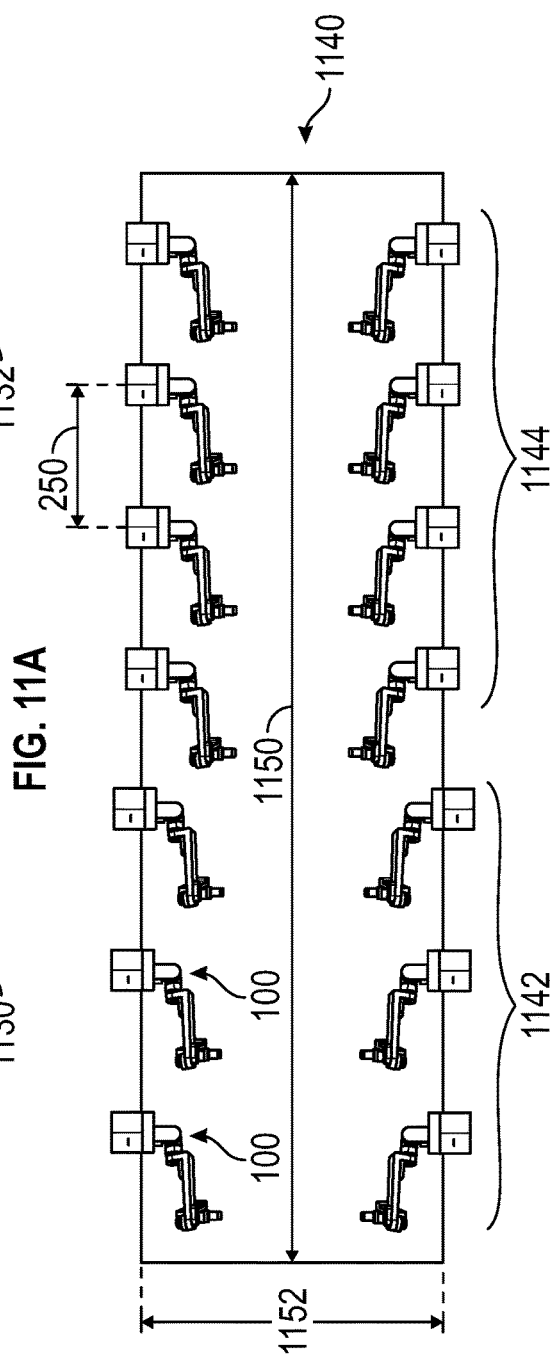
FIG. 11B is a diagram of a painting process line designed to handle the same number of jobs per hour as the line of FIG. 11A, where the line of FIG. 11B uses the Next Generation Painting Robot of the present disclosure.

FIG. 11A is a top-view diagram of a painting process line 1100 designed to use a previous generation of painting robots. FIG. 11B is a top-view diagram of a painting process line 1140 designed to handle the same number of jobs per hour as the line of FIG. 11A, where the line of 1140 FIG. 11B uses the Next Generation Painting Robot 100.

The painting process lines 1100 and 1140 have robots mounted along each side of the spray booth 200, with vehicles on a conveyor passing down the middle, as discussed previously. The painting robots each paint one side of the vehicle 300, and painting of top and cross-car surfaces such as the hood and roof may be divided up between the sides of the process line as appropriate. In addition to the painting robots, the process lines 1100 and 1140 also include opener robots (not shown) in the interior zones, which are robots configured to open and/or close doors, hoods and trunks/liftgates so as to allow both interior and exterior surfaces to be painted on the same process line.

The painting process line 1100 includes an interior zone 1102 where vehicle interior surfaces are painted, and an exterior zone 1104 where vehicle exterior surfaces are painted. Painting robots 1110 are used in both the interior zone 1102 and the exterior zone 1104, however the spacing is different between the zones. The interior zone 1102 places the robots 1110 at a spacing 1130 which is greater than a spacing 1132 used in the exterior zone 1104. This is because of the maneuvering necessary to paint interior surfaces; with the lack of flexibility of the robots 1110, arm flips are sometimes necessary, which requires greater spacing between robots. The painting process lines 1100 has a total area determined by a booth length 1120 multiplied by a booth width 1122.

The painting process line 1140 includes an interior zone 1142 where vehicle interior surfaces are painted, and an exterior zone 1144 where vehicle exterior surfaces are painted. Next Generation Painting Robots 100 are used in both the interior zone 1142 and the exterior zone 1144. The interior zone 1142 and the exterior zone 1144 may use the same robot-to-robot spacing 250 discussed previously, which is less than the spacing 1130 and 1132 used in the process line 1100. This is because of the near reach flexibility of the Next Generation Painting Robot 100, as described in detail previously. The painting process lines 1140 has a total area determined by a booth length 1150 multiplied by a booth width 1152.

It is readily apparent that the process line 1140 is much simpler and smaller than the process line 1100. This is because the Next Generation Painting Robot 100 is capable of painting both interior and exterior surfaces of the vehicle 300 using a single mounting configuration and a smaller spacing. Previous painting robot designs such as the robots 1110 had to be mounted and/or configured differently depending on whether a particular robot was assigned to perform interior painting or exterior painting. In contrast, all of the robots 100 on the process line 1140 are of the same configuration and mounting height. This not only improves space efficiency, but also enables the optimal reassignment of a painting task from one robot to another in the event a robot is placed in standby mode.

In one example, the space between robots is reduced from 2.8 meters (the spacing distance 1130) on the process line 1100 to 2.0 meters (the spacing distance 250) on the process line 1140. Also, as discussed earlier, the near reach flexibility of the robot 100 allows the spray booth width 1152 to be reduced compared to the booth width 1122. As a result of the reduced length and width, the process line 1140 requires 40% less spray booth floor space than the process line 1100, while handling the same number of vehicle body painting jobs per hour.

Another design feature of the Next Generation Painting Robot 100 is that service and cleaning can be performed without a service technician entering the spray booth 200, and without stopping paint line operation. These capabilities are enabled by use of the airlock booth 280 (already discussed briefly in regards to FIG. 6).

Painting robots inevitably accumulate paint overspray, and must be periodically cleaned to prevent excessive accumulation. Using current painting robots, the production process is interrupted for 30-minute cleaning "skips" two times per shift, amounting to 21 hours of non-painting time per week. The cleaning skips typically occur at shift changeover and mid-shift. A cleaning skip halts incoming car bodies and a multi-robot zone of the spray booth 200 is locked out and flushed with fresh air. Depending on the number of robots being cleaned and the time allotted, multiple operators are required to wipe the bells (outer part of the applicator 130), change overspray covers on outer arms and bells, wipe the top of the applicator cleaner 230, and clean windows for observation.

A significant operational cost advantage can be realized if the painting robot system is capable of being serviced and cleaned without shutting down the painting process line or even zones of the spray booth 200. In fact, by avoiding the cleaning "skips" every shift, a painting line using the robots 100 can paint in six days the same number of vehicles that present painting robot systems paint in seven days.

Figure 12:
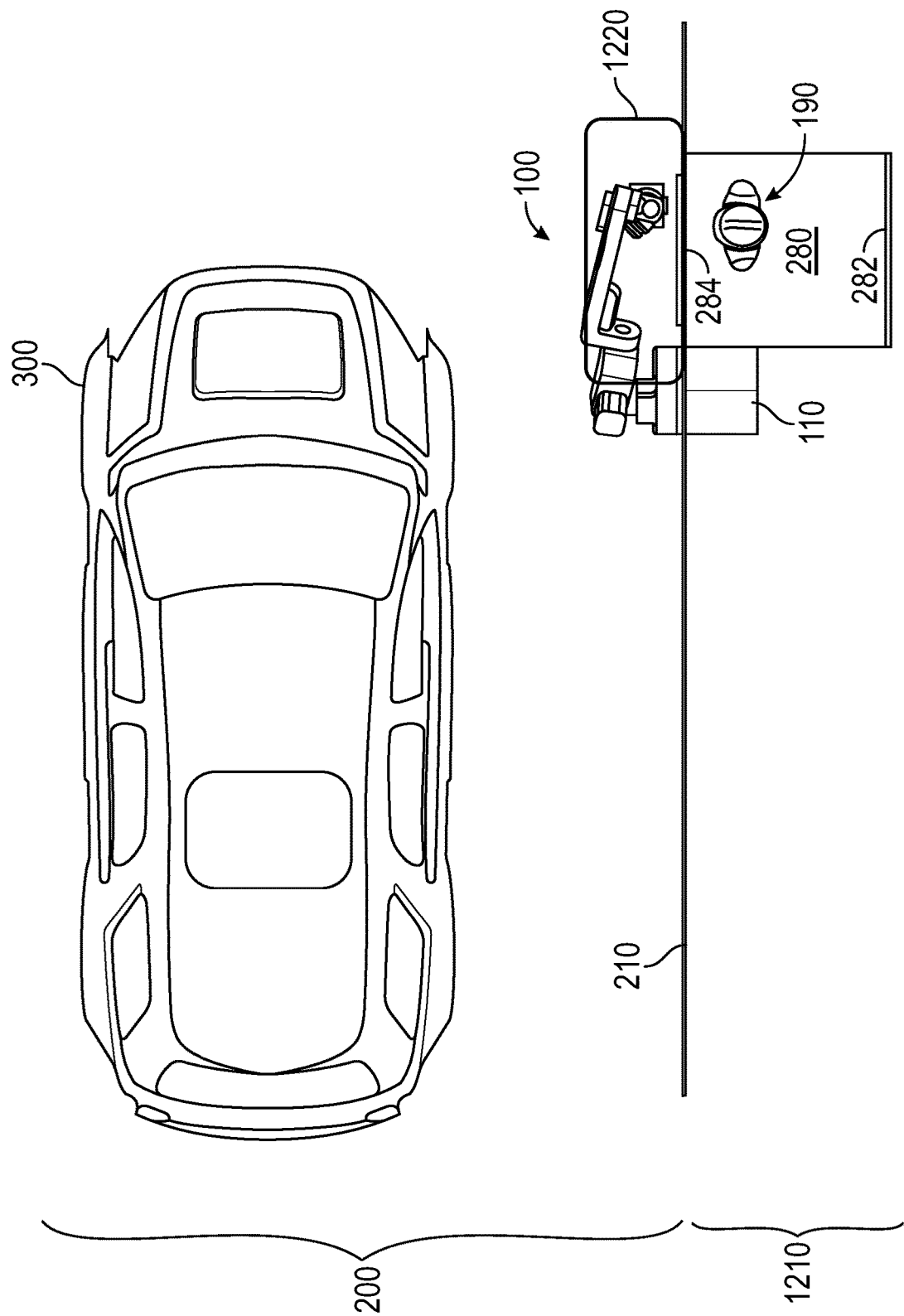
FIG. 12 is a top view illustration of one of the Next Generation Painting Robots parked at a service position where an operator in an airlock booth can perform cleaning and maintenance on the outer arm and applicator without stopping the painting process line or flushing the spray booth with fresh air, according to an embodiment of the present disclosure.

FIG. 12 is a top view illustration of one of the Next Generation Painting Robots 100 parked at a home position where an operator in an airlock booth can perform cleaning and maintenance on the outer arm and applicator without stopping the painting process line or flushing the spray booth with fresh air, according to an embodiment of the present disclosure.

The robot 100 and the vehicle 300 are inside the spray booth 200, while the side wall 210 separates the spray booth 200 from an operator aisle 1210. As discussed previously and commonly understood, the operator aisle 1210 is an inhabitable fresh-air environment, while the spray booth 200 is filled with paint fumes during painting operations and cannot be entered by the operator 190 until painting is stopped and the booth 200 (or a zone thereof) is flushed with fresh air.

In FIG. 12, the robot 100 has returned to the home position, where the applicator 130 is positioned on top of the cleaning stand 230 (not visible). Adjacent to the mounting stand 110 is the airlock booth 280, as shown previously in FIG. 6. The operator 190 has entered the airlock booth 280 through the aisle entry door 282 and then closed the aisle entry door 282. With the use of a self-contained breathing apparatus or umbilical breathing hose required in some situations, the operator 190 can open the booth entry door 284 and, reaching through the guard barrier 286, can perform certain cleaning and maintenance tasks on the robot 100. Unlike the cleaning skip of current painting robot systems, the cleaning/service of the robot 100 from the airlock booth 280 can be performed without having to stop all painting operations and flush the spray booth 200 with fresh air. Instead, the particular robot 100 can be put in standby or backup mode and its work can be temporarily assigned to other robots on the process line, as vehicles continue to be painted by other robots while the operator 190 performs the cleaning and service tasks on the particular robot 100.

A safe zone 1220 is defined around the robot 100 in its service position. The safe zone 1220 is an area which other adjacent robots are programmatically prohibited from entering, in order to ensure the safety of the operator 190. The safe zone 1220 may include additional sensors and lockout controls to protect the operator 190 while he/she is reaching into that portion of the spray booth 200. The physical guard or barrier 286 may be placed proximal the booth entry door 284, such as in the aperture of the entry door 284 (therefore not visible in FIG. 12), where the guard barrier 286 would allow the operator 190 to reach his/her arms into the safe zone 1220 but prevent the operator's body from entering the safe zone 1220, and prevent any part of the operator 190 from entering the spray booth 200 beyond the safe zone 1220. In addition, an environmental control protocol must be implemented for the airlock booth 280, where the booth 280 may need to be flushed with fresh air before the aisle entry door 282 may be opened (for operator entry or exit), and the operator 190 may need to confirm an independent breathing apparatus is in place and functioning before the booth entry door 284 may be opened.

The need for the use of a breathing apparatus by the operator 190 while in the airlock booth 280, and the need for the airlock booth 280 to be flushed with fresh air before the aisle entry door 282 is opened, depend on the type of paint being applied in the spray booth 200. If the vehicle 300 is being painted with a solvent-based paint (e.g., a lacquer) with hazardous fumes, then these fumes must not be inhaled by the operator 190 and must be prevented from escaping into the operator aisle 1210. In this situation, the breathing apparatus usage is required by the operator 190 while in the airlock booth 280, and the airlock booth 280 must be flushed with fresh air before the aisle entry door 282 is opened. In other situations, where the fumes are not hazardous, the aforementioned precautions may not be required.

Tasks which may be performed by the operator 190 from the airlock booth 280 include; changing or servicing the bell cup of the applicator 130; changing or servicing any process components mounted on the outer arm 120; cleaning or servicing the applicator cleaner 230; and changing overspray covers on the applicator 130 and the outer arm part 120. These tasks must inevitably be performed for routine maintenance and to prevent the painting robot from accumulating overspray and consequently causing defects on the part being painted. Performing the tasks without requiring painting line downtime prevents unwanted shutdown and is a significant improvement over previous painting robot systems.

Other maintenance tasks may also be performed during the same standby period, including replacing the fluid delivery equipment mounted in the cabinet 184 of the mounting stand 110 (as discussed previously), and running diagnostics tests for each process component to confirm correct operation or diagnose a problematic component. In some cases it may be possible to complete more time-consuming tasks—such as changing an applicator hose loom or mastering the robot. In all of these cases, only one individual robot 100 is taken offline, while all other robots in the spray booth 200 continue painting, and the other robots assume the painting responsibilities of the robot 100 which is offline for service or cleaning.

Figure 13:
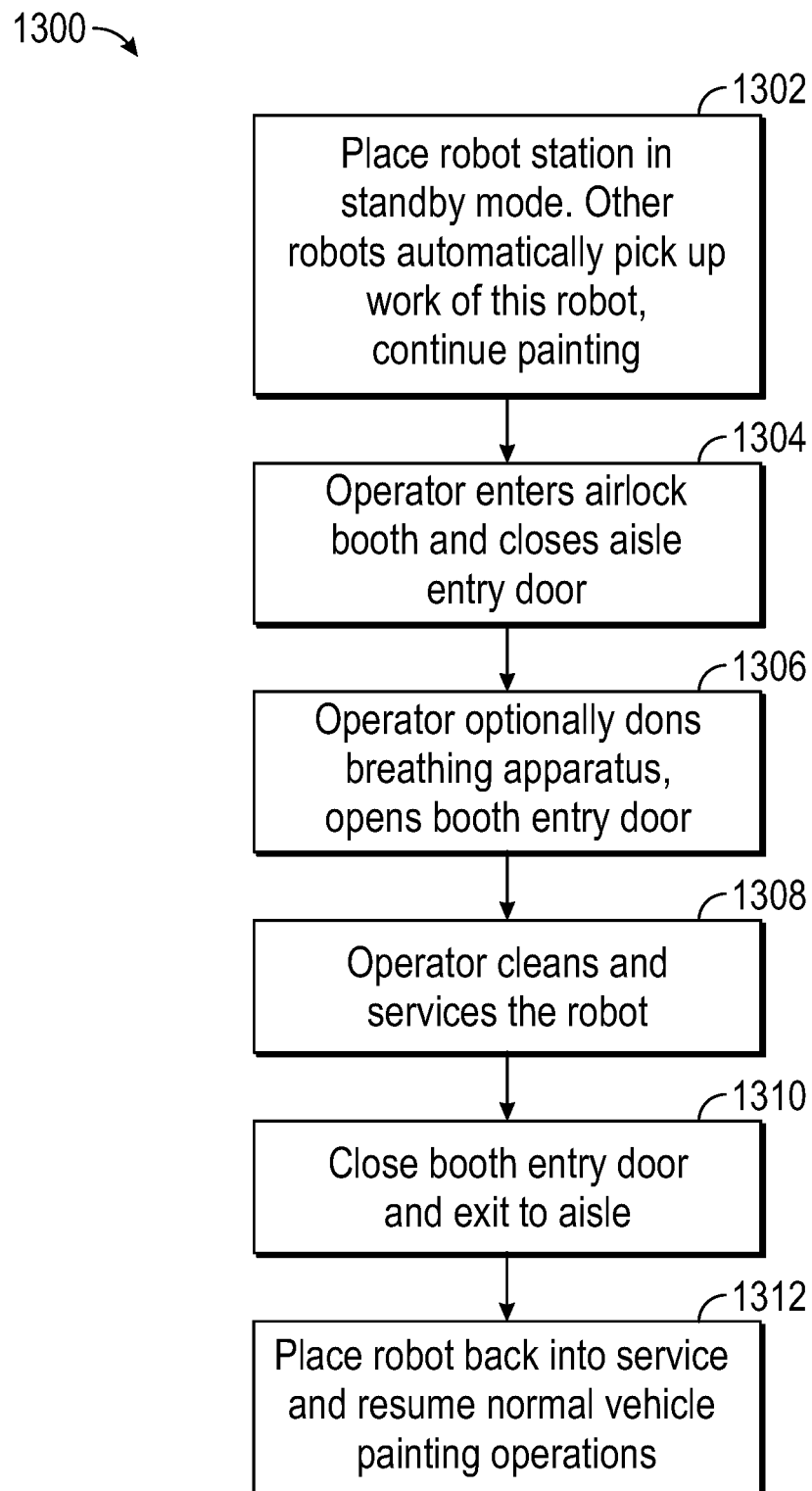
FIG. 13 is a flowchart diagram of a method for cleaning the outer arm and paint applicator of the Next Generation Painting Robot using the airlock booth and robot features shown in FIG. 12.

FIG. 13 is a flowchart diagram 1300 of a method for cleaning and service of the Next Generation Painting Robot 100 using the airlock booth 280 and robot features shown in FIG. 12. At box 1302, the particular robot 100 is placed in standby or backup mode, where the robot 100 returns to its home position and its painting tasks are assigned to other robots on the painting process line. Other robots in the spray booth 200 continue painting. At box 1304, the operator 190 enters the airlock booth 280 through the aisle entry door 282, and closes the aisle entry door 282. At box 1306, the operator 190 dons his/her breathing apparatus if it is required for the particular painting application and if it was not already being worn when the operator 190 entered the airlock booth 280. The operator 190 then opens the booth entry door 284 to gain access to the robot 100.

At box 1308, the operator 190 cleans and services the robot 100—including tasks such as wiping the bell and changing the overspray covers on the applicator 130 and the outer arm 120. The operator remains in the airlock booth 280 and reaches beyond the guard barrier 286 into the safe zone 1220 to perform the cleaning and service tasks. Other robots in the spray booth 200 continue painting, and the other robots which are adjacent to the robot 100 are programmatically prevented from entering the safe zone 1220. Other maintenance tasks may also be performed while the operator 190 is in the airlock booth 280. For example, a different maintenance person, in the operator aisle 1210, could service or replace the fluid delivery equipment in the cabinet 184, as discussed previously.

At box 1310, when finished with robot cleaning and service, the operator 190 closes the booth entry door 284. The airlock booth 280 is then flushed with fresh air, if required, and the operator exits the airlock booth 280 through the aisle entry door 282. At box 1312, the robot 100 is returned to normal mode, and continues normal painting operations. Throughout the entire process of the flowchart diagram 1300, the painting process line in the spray booth 200 has continued painting operations, thus avoiding lengthy downtime windows needed for cleaning present generation painting robots.

Figure 14:
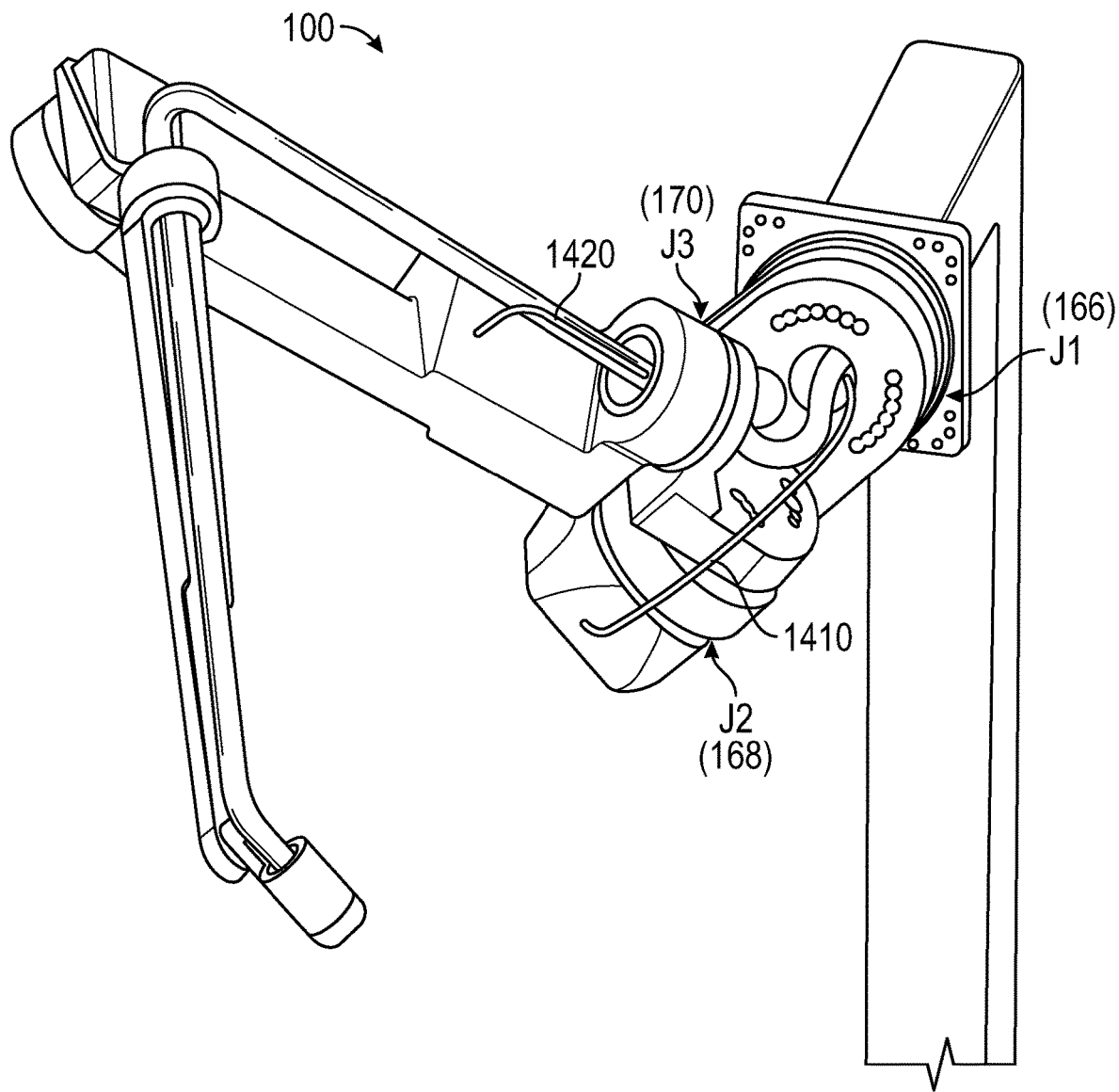
FIG. 14 is an illustration of the Next Generation Painting Robot with motor conductor cables routed external to the sealed robot joints, according to an embodiment of the present disclosure.

Another design element of the Next Generation Painting Robot 100 which enables simplified robot construction and lower cost is a new routing of motor control cables. FIG. 14 is an illustration of the Next Generation Painting Robot 100 with motor control cables routed external to the sealed robot joints, according to an embodiment of the present disclosure. The robot 100 of FIG. 14 shows some motor control cables external to and "across" the robot joints, rather than passing through air-purged cavities and within the hollow areas within the robot arms. A first cable set 1410 feeds the motors at joints J1 (166) and J2 (168), while a second cable set 1420 feeds the motors at joints J3-J6. A specially designed cable suitable for hazardous atmospheres is used. Other conductor cable routings are also possible.

The motor conductor cable routing of FIG. 14 offers advantages over other options. First, the traditional routing of motor conductors inside of hollow, sealed joints would not allow the advantage of using the optimum routing for the applicator supply line 140. With the conductors routed externally and sharing the same space as the supply line 140 as in FIG. 14, the joints can be designed and optimized for reach, flexibility and process performance.

The first cable set 1410 and the second cable set 1420 are flexible bundles of cables containing the number of conductors which are required in order to power the joint motors. The first cable set 1410 feeds only two motors (J1 and J2), but these are the largest motors in the robot 100, so the conductors have to be sized to handle the high currents accordingly. The second cable set 1420 feeds four or five joint motors (J3-J6 or J3-J7).

The first cable set 1410 and the second cable set 1420 may be wrapped in a flexible, solvent-compatible jacket. That is, the jacket is constructed of a flexible material which can withstand direct exposure to paints and solvents without deterioration or degradation. The conductor cables may alternatively be contained within flexible tubing which is purged to prevent ingress of paints and solvents, thereby protecting the individual conductor cables within. Each piece of flexible tubing may contain a single conductor cable routed to an individual motor (one for J2, one for J3, etc.).

The external conductor routing shown in FIG. 14, along with the placement of fluid delivery components upstream of the robot, the small arm and joint sizes, and other design considerations, all contribute to the dexterity (near reach flexibility) of the Next Generation Painting Robot 100. This dexterity leads in turn to other possibilities for robot mounting, spacing and serviceability—all of which enable greatly improved painting efficiency and paint line uptime.

Figure 15A:
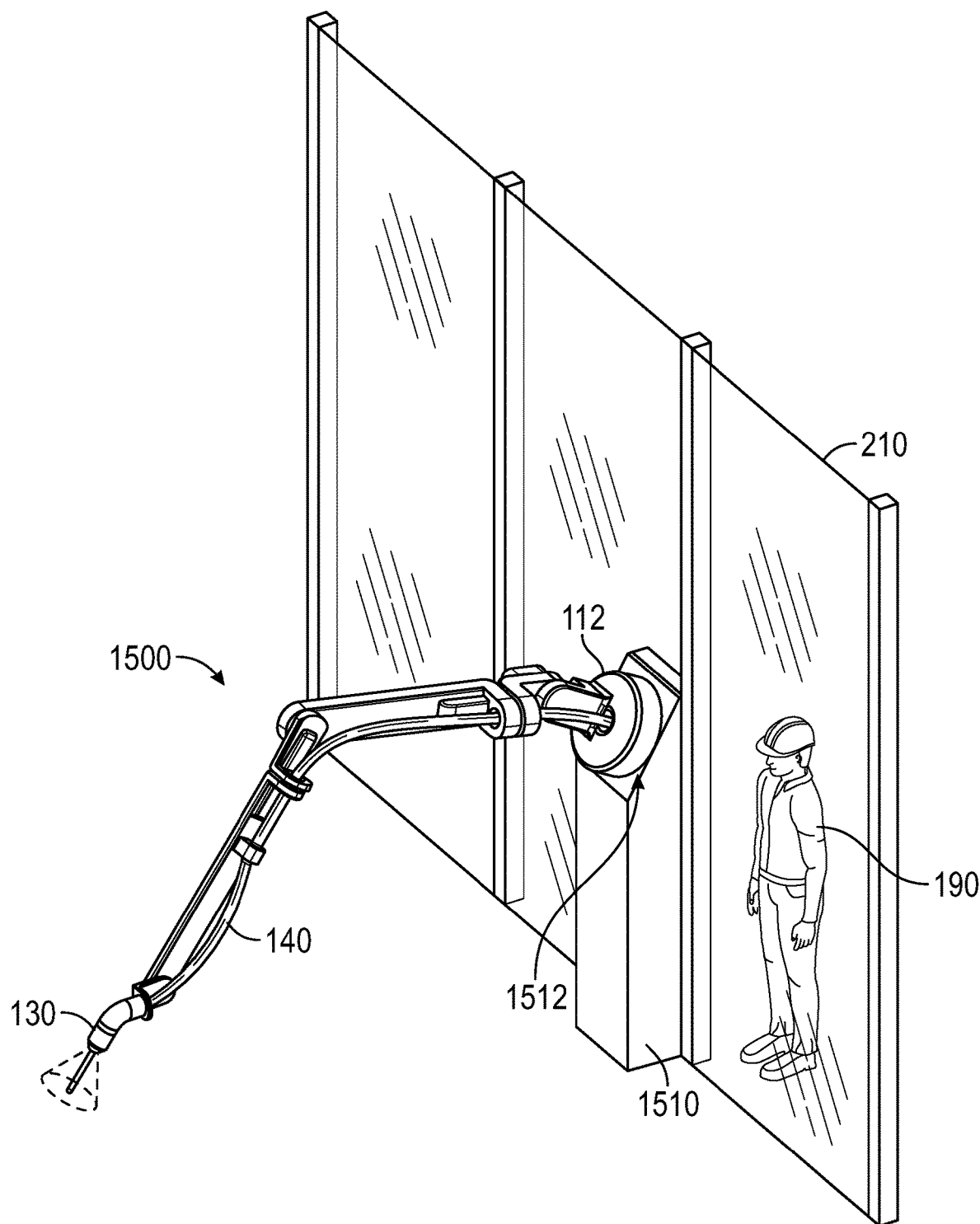
FIGS. 15A, 15B and 15C are illustrations of a Next Generation Painting Robot configuration in which the robot base rotates about a non-horizontal axis and the mounting stand protrudes into the spray booth, according to another embodiment of the present disclosure.
Figure 15B:
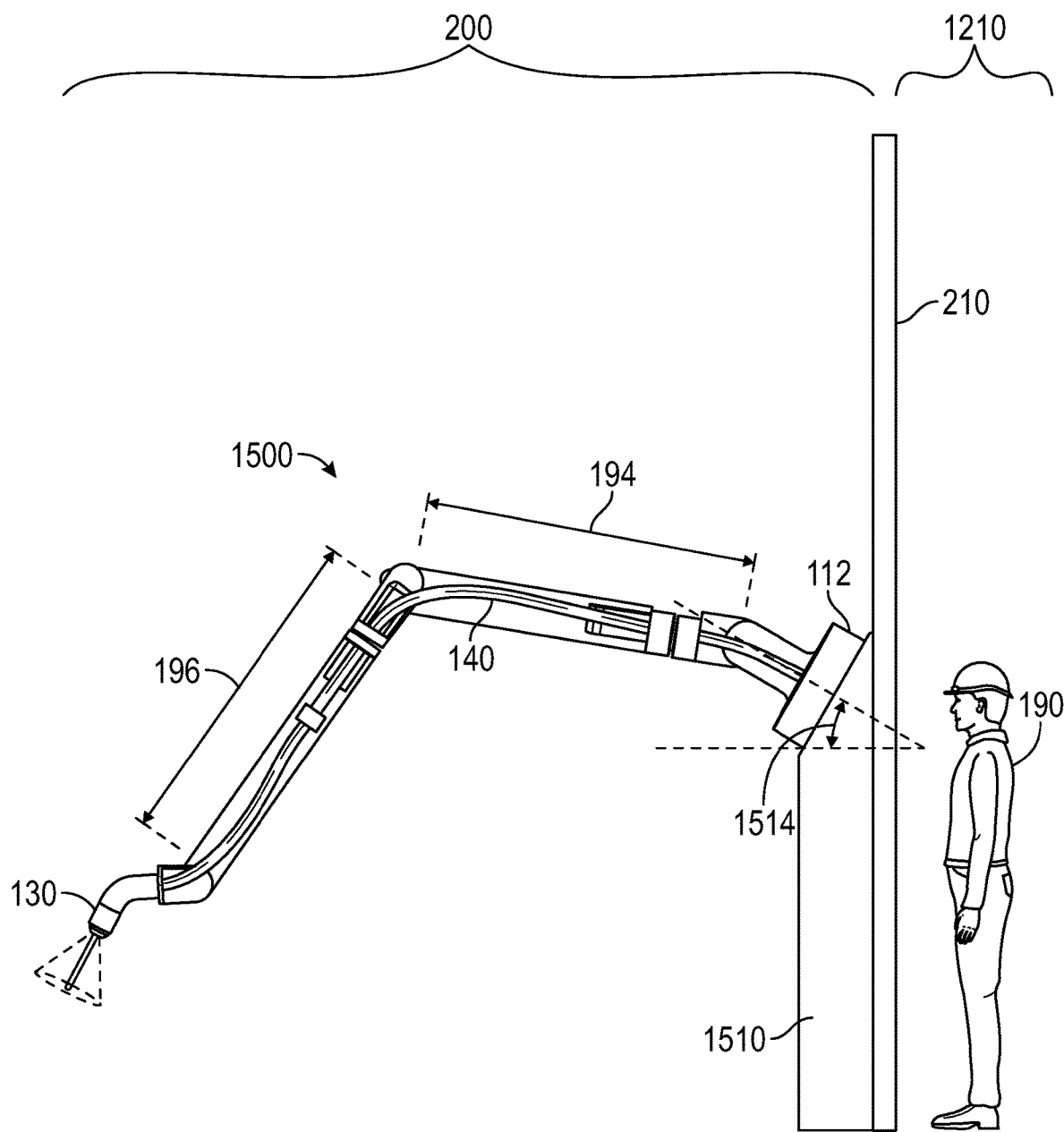
Figure 15C:
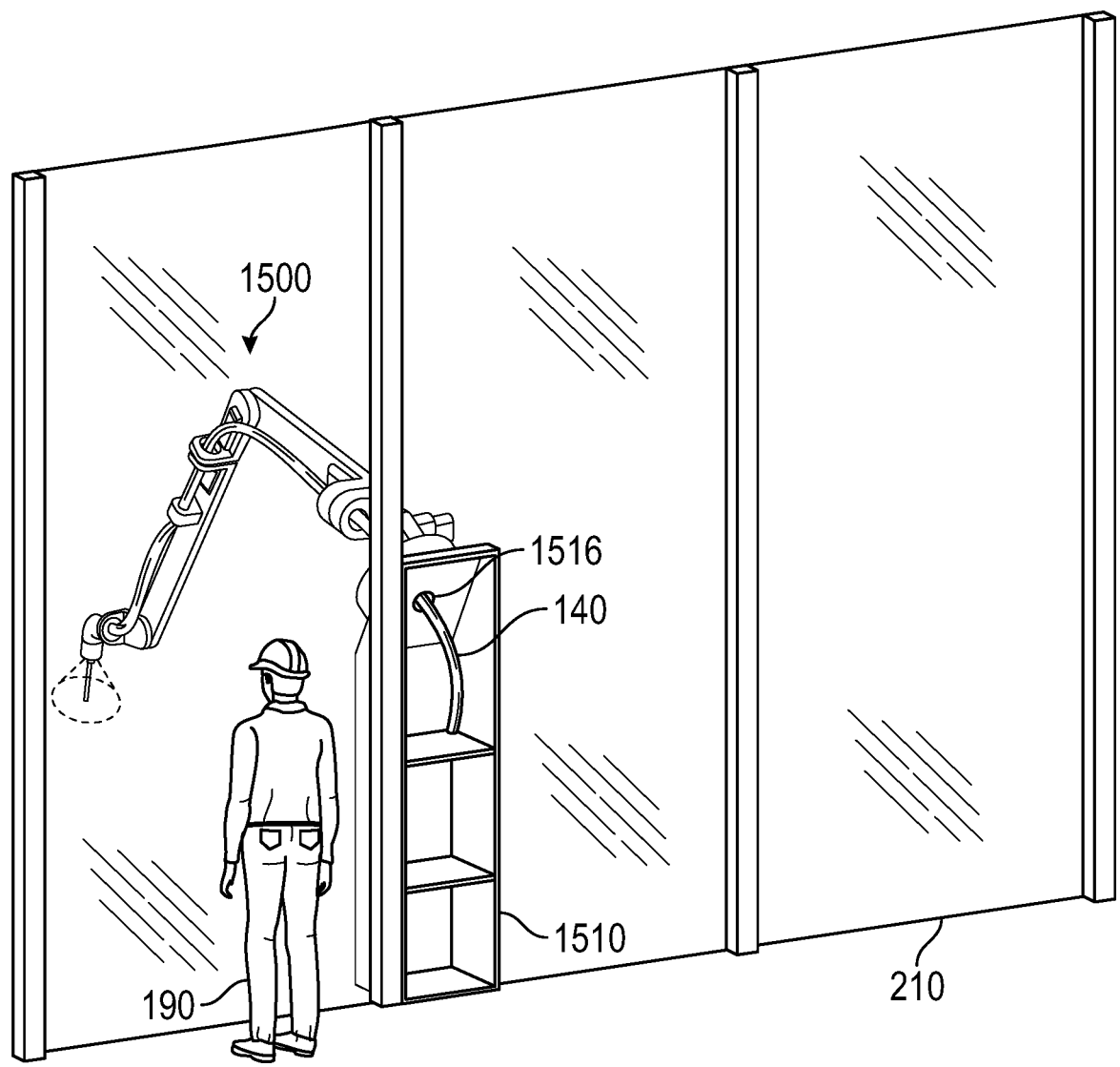

FIGS. 15A, 15B and 15C are illustrations of a Next Generation Painting Robot configuration in which the robot base rotates about a non-horizontal axis and the mounting stand protrudes into the spray booth, according to another embodiment of the present disclosure. A Next Generation Painting Robot 1500 is the same as the Next Generation Painting Robot 100 discussed previously except that it is pivotally mounted to a mounting stand 1510 about a non-horizontal axis. Also, the mounting stand 1510 protrudes into the spray booth, so that the joint J1 (166) between the robot base or turret 112 and the mounting stand 1510 is not in the plane of the side wall 210. In this configuration, the mounting stand 1510 is sealed to the side wall 210 and serves as part of the divider separating the spray booth 200 from the operator aisle 1210.

The mounting stand 1510 has a beveled top 1512 having a slope such that the J1 axis defines an angle 1514 with the horizontal. The J1 axis still intersects the booth center plane 222. The angle 1514 may be about 30 degrees, or larger or smaller as necessary to optimize the reach and flexibility of the robot 1500 for a particular spray booth application. In a preferred embodiment, the J1 axis as viewed from above is perpendicular to the side wall 210—that is, the J1 axis does not have an upstream or downstream angle. The amount of protrusion of the mounting stand's beveled top 1512 into the spray booth 200 is also configurable to optimize the reach of the robot 1500 for a particular application.

The inner arm length 194 and the outer arm length 196, discussed previously, are depicted in FIG. 15B. The applicator supply line 140 is also visible in all of FIGS. 15A/15B/15C, where the applicator supply line 140 can be seen to pass through a hole 1516 in the beveled top 1512 of the mounting stand 1510. This allows the applicator supply line 140 to be routed with minimal length from the pumping device 182 to the applicator 130, as discussed previously.

Although not shown in FIGS. 15a/15B/15C, the airlock booth 280 can be used in conjunction with the robot 1500 and the mounting stand 1510 to enable cleaning of the applicator 130 and outer arm parts without stopping the entire paint production line and evacuating the fumes from the spray booth 200.

Using the exact same robot hardware as the Next Generation Painting Robot 100, the robot 1500 and the mounting stand 1510 offer additional design parameters for optimizing flexibility and reach for a particular spray painting application.

Throughout the preceding discussion, various controllers are described and implied—for controlling motions and tasks of an individual robot, for master control of the entire painting process line, etc. It is to be understood that the software applications and modules of these controllers are executed on one or more computing devices having a processor and a memory module, including algorithms configured in non-volatile memory. In one non-limiting embodiment, each of the robots 100 has a local dedicated controller, and each of the robot controllers communicates with a painting line master controller. The communication between the robots, the local robot controllers and the painting line master controller may be over a hard-wire network, or may use any suitable wireless technology—such as a cellular phone/data network, Wi-Fi, broadband Internet, etc.

As outlined above, the Next Generation Painting Robot provides many substantial productivity benefits to vehicle manufacturers. The robot design mounts fluid delivery components outside the spray booth, enabling servicing of the components without spray booth downtime, and providing a broader color offering while at the same time reducing color change paint waste time and material below current standards. The highly flexible reach envelope enables mounting robots closer together in a compact spray zone, thereby reducing the paint booth footprint, and consequently reducing capital cost and energy demands. The Next Generation Painting Robot design also offers higher reliability with the capability to be serviced and cleaned during production operation. System uptime is dramatically improved, with the resultant increase in throughput on the vehicle painting line.

While a number of exemplary aspects and embodiments of the Next Generation Painting Robot have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A coating system for performing a coating process on a part conveyed through a painting cabin, said coating system comprising:

two or more painting robots each with at least five rotational axes, each of the painting robots having a robot base rotatable about a mounting stand, an inner arm rotatable about the robot base, an outer arm rotatable about the inner arm, a robot wrist attached to a free end of the outer arm, and a coating applicator coupled to the robot wrist; and an airlock booth positioned proximal to the mounting stand of at least one of the painting robots, said airlock booth having a first door opening to an operator aisle and a second door opening to the painting cabin, where the airlock booth is configured such that certain components of the one of the painting robots are accessible by an operator in the airlock booth when the robot one of the painting robots is parked in a service position and the second door is open, where other painting robots in the painting cabin continue painting while the operator in the airlock booth services the one of the painting robots, and where paint vapors from the painting cabin are prevented from entering the operator aisle, and wherein a safe zone is defined within the painting cabin, where the safe zone is a space adjacent the airlock booth within which the operator is allowed to reach in order to service the one of the painting robots, and the service position of the one of the painting robots locates the certain components within the safe zone, and adjacent painting robots are prevented from entering the safe zone by envelope restriction software running on controllers of the adjacent painting robots.

2. The coating system according to claim 1 wherein the airlock booth operates in a sequence including:
permitting the operator to enter the airlock booth from the operator aisle through the first door;
permitting the operator to open the second door to access the robot one of the painting robots in the painting cabin;
servicing the certain components of the one of the painting robots by the operator in the airlock booth;
permitting the operator to close the second door after completing servicing; and
permitting the operator to exit the airlock booth to the operator aisle through the first door.

3. The coating system according to claim 1 further comprising a breathing apparatus, where the breathing apparatus is an umbilical breathing device incorporated into the airlock booth and is donned by the operator prior to opening the second door.

4. The coating system according to claim 1 further comprising a ventilation system to flood the airlock booth with fresh air after servicing the components is completed and the second door is closed and before the operator opens the first door to exit the airlock booth.

5. The coating system according to claim 1 further comprising a guard positioned in an aperture of the second door and configured to allow the operator in the airlock booth to reach into the safe zone of the painting cabin but not enter the painting cabin.

6. The coating system according to claim 1 further comprising sensors configured to detect the operator bodily moving into the safe zone and detect the operator reaching beyond the safe zone into the painting cabin.

7. The coating system according to claim 1 wherein services performed by the operator while in the airlock booth include cleaning the coating applicator of the robot, replacing components of the coating applicator, replacing arm-mounted paint delivery components, replacing overspray covers on the coating applicator and the outer arm, cleaning a cleaning station mounted to a floor of the painting cabin, and cleaning windows for visibility into the painting cabin.

8. The coating system according to claim 1 wherein each of the painting robots includes a color changer and a pumping device mounted to a back side of the mounting stand, said color changer and pumping device being accessible and serviceable from the operator aisle.

9. A coating system for performing a coating process on a part conveyed through a painting cabin, said system comprising:
two or more painting robots each with at least five rotational axes, each of the painting robots having a robot base rotatable about a mounting stand, an inner arm rotatable about the robot base, an outer arm rotatable about the inner arm, a robot wrist attached to a free end of the outer arm, and a coating applicator coupled to the robot wrist;
an airlock booth positioned proximal to the mounting stand of at least one of the painting robots, said airlock booth having a first door opening to an operator aisle and a second door opening to the painting cabin; and
sensors configured to detect bodily movement of an operator,
where the airlock booth is configured such that certain components of the one of the painting robots are accessible by the operator in the airlock booth when the one of the painting robots is parked in a service position and the second door is open, where other painting robots in the painting cabin continue painting while the operator in the airlock booth services the one of the painting robots, and where paint vapors from the painting cabin are prevented from entering the operator aisle,
and wherein a safe zone is defined as a space within the painting cabin adjacent the airlock booth within which the operator is allowed to reach in order to service the one of the painting robots, where the sensors are configured to detect the operator bodily moving into the safe zone and detect the operator reaching beyond the safe zone into the painting cabin, and the service position of the one of the painting robots locates the certain components within the safe zone.

10. A method for servicing a painting robot system, said method comprising:
providing a painting robot having a robot base rotatable about a mounting stand, said painting robot also having inner and outer arms connecting a robot wrist to the robot base, said painting robot further including a coating applicator coupled to the robot wrist;
providing an airlock booth positioned adjacent to the mounting stand of the painting robot, said airlock booth having a first door opening to an operator aisle and a second door opening to a painting cabin, where a safe zone is defined within the painting cabin, the safe zone being a space adjacent the airlock booth within which an operator is allowed to reach in order to service the painting robot;
placing the painting robot in a standby mode, where the painting robot discontinues painting and returns the coating applicator to a service position, while other painting robots in the painting cabin continue painting, the other painting robots assuming painting responsibilities of the painting robot which is in standby mode;

entering the airlock booth from the operator aisle and closing the first door by an operator;

opening the second door to access the painting robot by the operator;

servicing certain components of the painting robot located within the safe zone by the operator while adjacent painting robots are prevented from entering the safe zone by envelope restriction software running on controllers of the adjacent painting robots;

closing the second door by the operator after completing servicing;

exiting the airlock booth to the operator aisle through the first door by the operator; and placing the painting robot in an operational mode and resuming painting operations by the painting robot.

11. The method according to claim 10 further comprising donning a breathing apparatus by the operator prior to opening the second door, where the breathing apparatus is an umbilical breathing device incorporated into the airlock booth.

12. The method according to claim 10 further comprising operating a ventilation system to flood the airlock booth with fresh air after servicing the components is completed and the second door is closed and before the operator opens the first door to exit the airlock booth.

13. The method according to claim 10 wherein a guard is positioned in an aperture of the second door and configured to allow the operator in the airlock booth to reach into the safe zone of the painting cabin but not enter the painting cabin.

14. The method according to claim 10 wherein sensors are configured to detect the operator bodily moving into the safe zone and detect the operator reaching beyond the safe zone into the painting cabin.

15. The method according to claim 10 wherein services performed by the operator while in the airlock booth include cleaning the coating applicator of the painting robot, replacing components of the coating applicator, replacing arm-mounted paint delivery components, replacing overspray covers on the coating applicator and the outer arm, cleaning a cleaning station mounted to a floor of the painting cabin, and cleaning windows for visibility into the painting cabin.

16. The method according to claim 10 wherein the painting robot includes a color changer and a pumping device mounted to a back side of the mounting stand, said color changer and pumping device being accessible and serviceable from the operator aisle.

17. The method according to claim 16 further comprising servicing the color changer or the pumping device from the operator aisle while the painting robot is in the standby mode.

* * * * *